US008630368B2

(12) United States Patent
Nishio et al.

(10) Patent No.: US 8,630,368 B2
(45) Date of Patent: Jan. 14, 2014

(54) TRANSMITTING APPARATUS, RECEIVING APPARATUS, TRANSMITTING METHOD, AND RECEIVING METHOD

(75) Inventors: Akihiko Nishio, Osaka (JP); Kenichi Miyoshi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/538,839

(22) Filed: Jun. 29, 2012

(65) Prior Publication Data

US 2012/0263140 A1    Oct. 18, 2012

Related U.S. Application Data

(63) Continuation of application No. 11/658,503, filed as application No. PCT/JP2005/013755 on Jul. 27, 2005.

(30) Foreign Application Priority Data

Jul. 29, 2004 (JP) ................................. 2004-221587
Mar. 8, 2005 (JP) ................................. 2005-064183
Jul. 20, 2005 (JP) ................................. 2005-210253

(51) Int. Cl.
    *H04L 27/00*    (2006.01)
(52) U.S. Cl.
    USPC .......................................... 375/295; 375/316
(58) Field of Classification Search
    USPC .................................. 375/295, 316, 219, 329
    See application file for complete search history.

(56) References Cited

U.S. PATENT DOCUMENTS

| 6,158,041 | A | 12/2000 | Raleigh et al. |
| 6,493,333 | B1 | 12/2002 | Kim et al. |
| 6,980,509 | B1 | 12/2005 | Okada |
| 6,985,432 | B1 | 1/2006 | Hadad |
| 7,170,850 | B2 * | 1/2007 | Okada et al. ................. 370/208 |
| 7,289,425 | B2 | 10/2007 | Yeh et al. |
| 7,317,747 | B2 | 1/2008 | Miyazaki et al. |
| 7,366,243 | B1 | 4/2008 | McCrady |
| 7,369,626 | B1 | 5/2008 | Chiodini et al. |
| 7,382,838 | B2 | 6/2008 | Peting |
| 7,529,315 | B2 * | 5/2009 | Sudo ............................ 375/295 |

(Continued)

FOREIGN PATENT DOCUMENTS

| CN | 1341304 | 3/2002 |
| EP | 1 398 927 | 3/2004 |

(Continued)

OTHER PUBLICATIONS

Chinese Office Action dated Apr. 10, 2009.

(Continued)

*Primary Examiner* — Shuwang Liu
*Assistant Examiner* — Nader Bolourchi
(74) *Attorney, Agent, or Firm* — Dickinson Wright PLLC

(57) ABSTRACT

There is disclosed a radio transmission device capable of improving the throughput. The radio transmission device transmits a first signal and a second signal which are different from each other. In the radio transmission device, an FFT unit subjects first data to an FFT process. A sub-carrier allocation unit maps the first data which has been subjected to the FFT process and the second data into different frequencies. An IFFT unit subjects the mapped signal to the IFFT transform. A transmission radio processing unit transmits the signal which has been subjected to the IFFT processing, with a single carrier.

10 Claims, 23 Drawing Sheets

(56) References Cited

U.S. PATENT DOCUMENTS

| | | | |
|---|---|---|---|
| 7,583,736 B2 * | 9/2009 | Miyoshi et al. | ............... 375/260 |
| 7,606,138 B2 | 10/2009 | Wang et al. | |
| 2003/0169824 A1 | 9/2003 | Chayat | |
| 2005/0208906 A1 | 9/2005 | Miyoshi et al. | |
| 2005/0249127 A1 | 11/2005 | Huo et al. | |
| 2006/0002288 A1 | 1/2006 | Okada et al. | |
| 2006/0002451 A1 | 1/2006 | Fukuta et al. | |
| 2006/0160498 A1 | 7/2006 | Sudo | |

FOREIGN PATENT DOCUMENTS

| | | |
|---|---|---|
| JP | 2000-332722 | 11/2000 |
| JP | 2004-129249 | 4/2004 |
| JP | 2004-187257 | 7/2004 |

OTHER PUBLICATIONS

International Search Report dated Sep. 27, 2005.
H. Kobayashi, et al., "Tekio Hencho o Mochiita Single Carrier OFDM Tsushin Hoshiki—Single Carrier OFDM Technique with Adaptive Modulation Method" The Transactions of the Institute of Electronics, Information and Communication Engineers, vol. J86-A, No. 12, Dec. 2003, pp. 1329-1339.
D. Falconer, et al., "Frequency Domain Equalization for Single-Carrier Broadband Wireless Systems," IEEE Communications Magazine, Apr. 2002, pp. 58-66.
H. Gacanin, et al., "Shuhasu Ryoiki Toka o Mochiiru Ippanka OFDM—Generalized OFDM with Frequency-domain Equalization," Technical Report of IEICE, MW2003-252, Mar. 2004, pp. 19-24.
Hyung G. Myung; Junsung Lim; David J. Goodman, "Single carrier FDMA for uplink wireless transmission," IEEE Vehicular Technology Magazine, vol. 1, Issue: 3, Publication Year: 2006, pp. 30-38.
Suzuki, S.; Takyu, O.; Umeda, Y., "Performance evaluation of effect of nonlinear distortion in SC-FDMA system," 2008 International Symposium on Information Theory and Its Applications (ISITA 2008), Publication Year: 2008 , pp. 1-5.
Hyung G. Myung; Junsung Lim; David J. Goodman, "Peak-To-Average Power Ratio of Single Carrier FDMA Signals with Pulse Shaping," 2006 IEEE 17th International Symposium on Personal, Indoor and Mobile Radio Communications, Publication Year: 2006 , pp. 1-5.
Falconer, D.; Ariyavisitakul, S.L.; Benyamin-Seeyar, A.; Eidson, B.; "Frequency domain equalization for single-carrier broadband wireless systems", IEEE Communications Magazine, vol. 40 , Issue: 4, Publication Year: 2002 , pp. 58-66.
European Search Report dated Nov. 29, 2012.

* cited by examiner

TRANSMITTING APPARATUS, RECEIVING APPARATUS, TRANSMITTING METHOD, AND RECEIVING METHOD

This is a continuation application of application Ser. No. 11/658,503 filed Jan. 25, 2007, which is a national stage of PCT/JP2005/013755 filed Jul. 27, 2005, which is based on Japanese Application No. 2004-221587 filed Jul. 29, 2004, Japanese Application No. 2005-064183 filed Mar. 8, 2005, and Japanese Application No. 2005-210253 filed Jul. 20, 2005, the entire contents of each of which are incorporated by reference herein.

TECHNICAL FIELD

The present invention relates to a radio transmitting apparatus and radio receiving apparatus, and more particularly to a radio transmitting apparatus and radio receiving apparatus used in a mobile communication system in which single-carrier frequency equalization technology is applied.

BACKGROUND ART

In recent years, looking toward next-generation mobile communication systems, studies have been conducted on radio transmission methods suitable for high-speed packet transmission capable of achieving data rates in excess of 100 Mbps, for example. Broadband is necessary for the frequency band used for such high-speed transmission, and the use of a bandwidth on the order of 100 MHz has been studied, for example.

In mobile communications, when this kind of broadband transmission is performed using a single carrier, BER (Bit Error Rate) performance may deteriorate significantly as a result of interference due to multipath propagation (delayed waves). Propagation paths in which multipath propagation is present are subject to frequency selective fading —that is to say, a property of such propagation paths is that fading fluctuation differs according to frequency.

Single-carrier frequency equalization technology has been studied as a technology for eliminating the effects of multipath interference and reproducing a waveform. This technology is an equalization technology that can be implemented with a simple configuration. Also, equalization processing is performed on a signal transmitted by means of a single carrier by multiplying the inverse characteristic of a propagation path frequency characteristic estimate by a received signal in the frequency domain (see Non-patent Document 1, for example). Furthermore, an advantage of this technology is that, since transmission is performed using a single carrier, the PAPR (Peak to Average Power Ratio) is lower than in multicarrier transmission, and an amplifier with a wide linear region is not as necessary as in a multicarrier transmitting apparatus.

Non-patent Document 1: "Frequency Domain Equalization for single-Carrier Broadband Wireless Systems", IEEE Communications Magazine, April 2002, pp. 58-66

DISCLOSURE OF INVENTION

Problems to be Solved by the Invention

However, in a conventional mobile communication system in which broadband transmission is performed using a single carrier, even though propagation path characteristics differ on a frequency-by-frequency basis and there are frequencies with good reception quality and frequencies with poor reception quality, it is difficult to differentiate between these and perform adaptive transmission. Consequently, there is a certain limit to improvements in throughput.

It is an object of the present invention to provide a radio transmitting apparatus and radio receiving apparatus that enable throughput to be improved.

Means for Solving the Problems

A radio transmitting apparatus of the present invention employs a configuration that includes, in a radio transmitting apparatus that transmits a mutually different first signal and second signal: a conversion section that executes time-domain to frequency-domain conversion on a first signal; a mapping section that maps a first signal on which conversion has been executed and a second signal onto mutually different frequencies; a reverse-conversion section that executes frequency-domain to time-domain reverse-conversion on a signal generated by mapping by the mapping section; and a transmitting section that transmits a signal on which reverse-conversion has been executed by means of a single carrier.

According to this configuration, signals can be multiplexed in the frequency domain while suppressing an increase in peak power in single-carrier transmission, and throughput can be improved.

Advantageous Effect of the Invention

The present invention can improve throughput.

BEST MODE FOR CARRYING OUT THE INVENTION

Embodiments of the present invention will now be described in detail with reference to the accompanying drawings.

(Embodiment 1)

Figure 1:
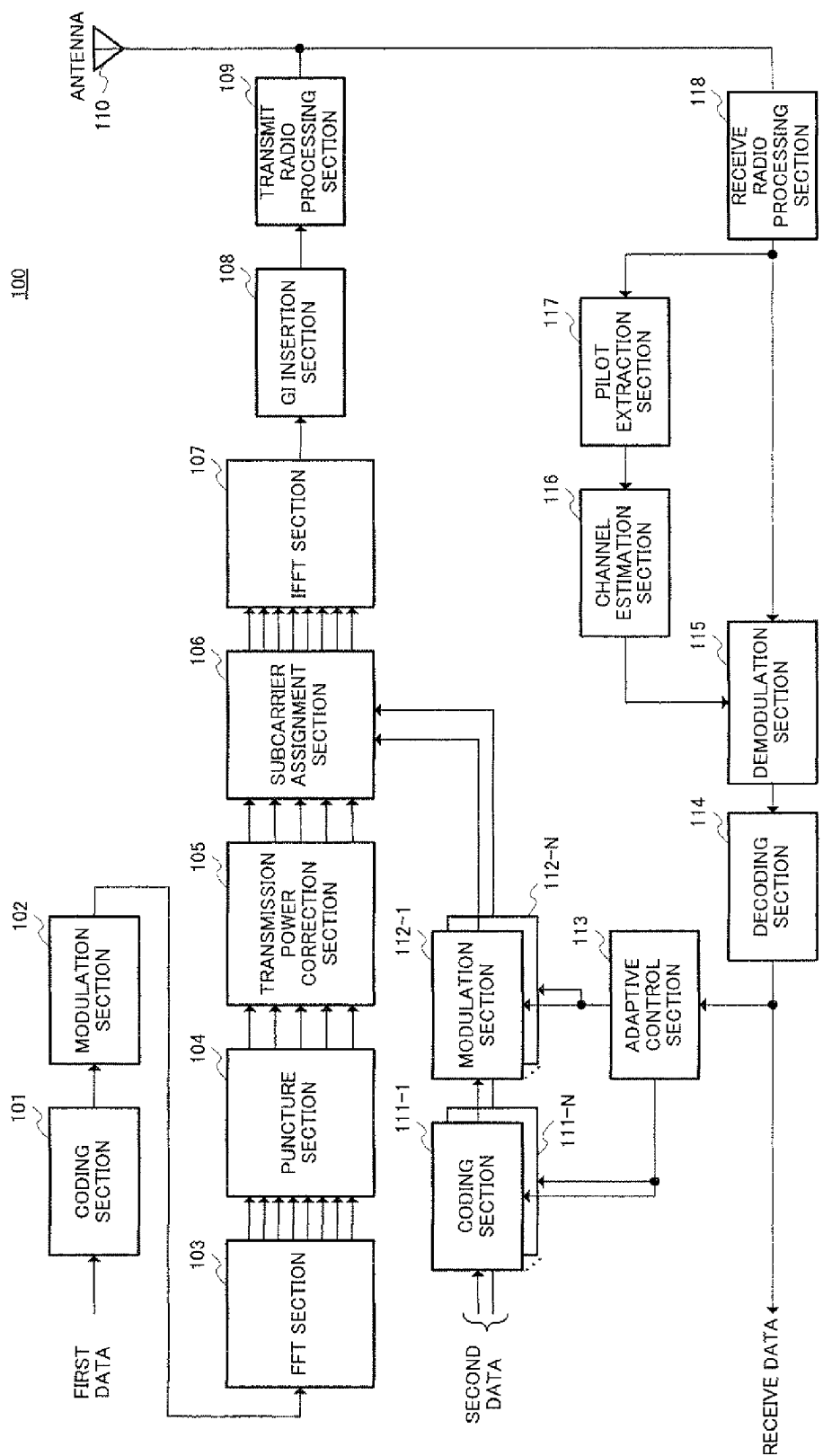
FIG. 1 is a block diagram showing the configuration of a radio transmitting apparatus according to Embodiment 1 of the present invention.
Figure 2:
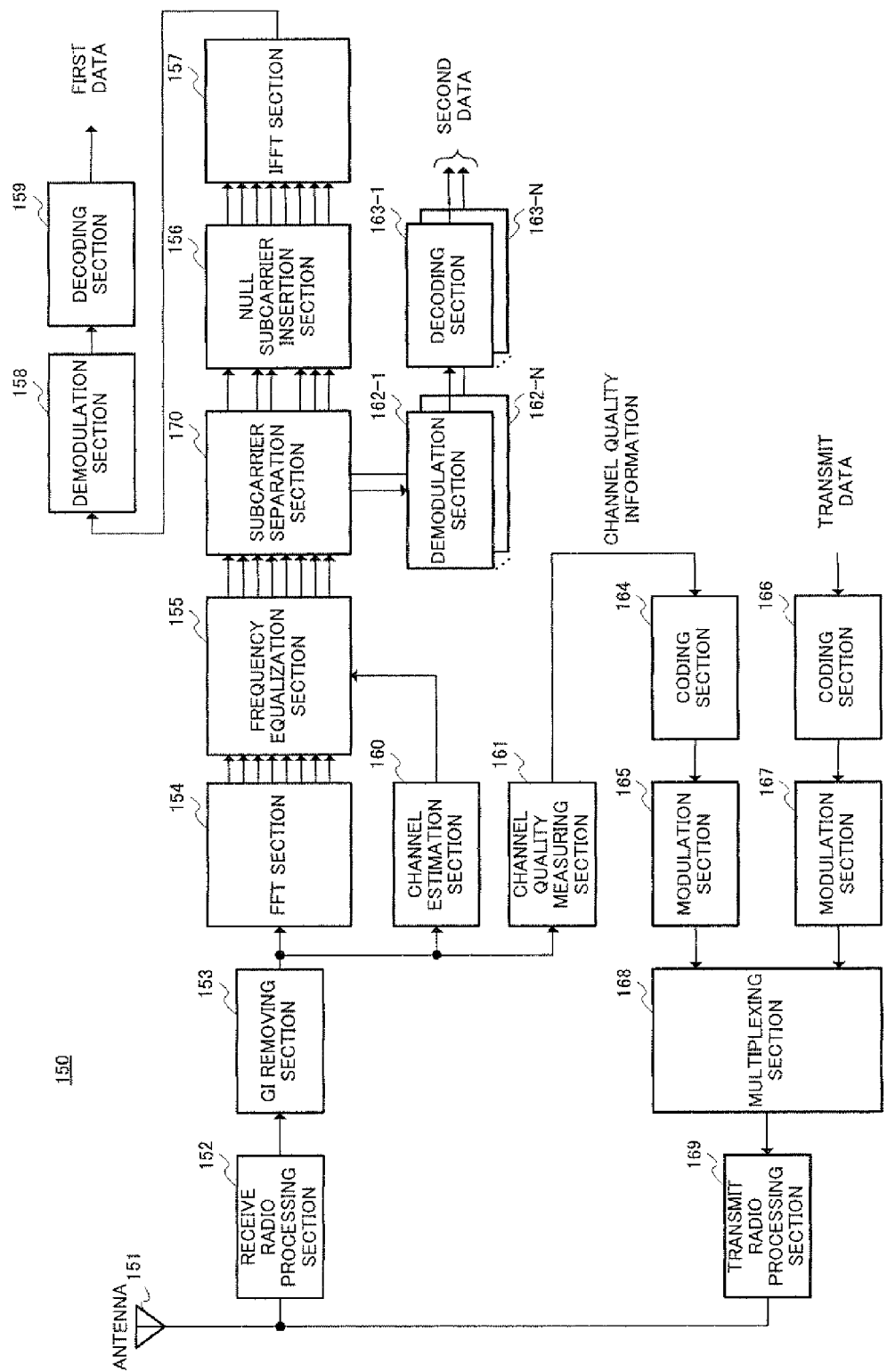
FIG. 2 is a block diagram showing the configuration of a radio receiving apparatus according to Embodiment 1 of the present invention.

FIG. 1 is a block diagram showing the configuration of a radio transmitting apparatus according to Embodiment 1 of the present invention, and FIG. 2 is a block diagram showing the configuration of a radio receiving apparatus that performs radio communication with radio transmitting apparatus 100 in FIG. 1.

Radio transmitting apparatus 100 in FIG. 1 has coding section 101, modulation section 102, FFT (Fast Fourier Transform) section 103, puncture section 104, transmission power correction section 105, subcarrier assignment section 106, IFFT (Inverse Fast Fourier Transform) section 107, GI (Guard Interval) insertion section 108, transmit radio processing section 109, antenna 110, N (where N is an integer value of 2 or above) coding sections 111-1, . . . , 111-N, N modulation sections 112-1, . . . , 112-N, adaptive control section 113, decoding section 114, demodulation section 115, channel estimation section 116, pilot extraction section 117, and receive radio processing section 118.

A first data signal (hereinafter referred to as "first data"), and a second data signal (hereinafter referred to as "second data") different from the first data, acquired by a preceding-stage data acquisition section (not shown), are input respectively to coding section 101 and coding sections 111-1 through 111-N. A pilot signal is multiplexed (by time division multiplexing, for example) with the first data.

Coding section 101 codes input first data. Here, coding section 101 performs coding on first data transmitted by means of a single carrier. Therefore, the coding rate used in coding by coding section 101 is not set individually for a plurality of (for example, K) frequencies within the single carrier band. That is to say, coding section 101 sets the used coding rate as a coding rate common to the K frequencies.

The N coding sections 111-1 through 111-N code input second data using a coding rate specified for each frequency by adaptive control section 113. The second data input here is assumed to be parallel data resulting from serial/parallel conversion of N packets or one packet.

In this embodiment and subsequent embodiments, each frequency (or frequency band) in the single-carrier band used can be considered as a virtual subcarrier in the communication band, and can also be considered as a subband representing fragmentation of the communication band. Therefore, for the sake of convenience, each frequency (or frequency band) may also be referred to as a "subcarrier" in the following description. Also, a signal component corresponding to a frequency (or frequency band)—that is, a frequency component—is referred to as a "component."

Modulation section 102 modulates first data coded by coding section 101. Here, modulation section 102 performs modulation on first data transmitted by means of a single carrier. Therefore, the modulation method used in modulation by modulation section 102 is not set individually for K frequencies. That is to say, modulation section 102 sets the used modulation method as a modulation method common to the K frequencies.

Modulation sections 112-1 through 112-N modulate second data coded by coding sections 111-1 through 111-N respectively, using a modulation method specified for each frequency by adaptive control section 113.

Adaptive control section 113 sets the coding rate and modulation method for each frequency adaptively based on channel quality information acquired by decoding section 114. When these settings are made, a previously prepared table is referenced that indicates combinations of modulation method and coding rate associated with channel quality information.

Information used for coding rate and modulation method setting is not limited to channel quality information. For example, received power, interference power, error rate, attainable transmission rate, throughput, transmission power necessary to achieve a predetermined error rate, SIR (Signal to Interference Ratio), SNR (Signal to Noise Ratio), CIR (Carrier to Interference Ratio), CNR (Carrier to Noise Ratio), SINR (Signal to Interference and Noise Ratio), CINR (Carrier to Interference and Noise Ratio), RSSI (Received Signal Strength Indicator), an MCS (Modulation and Coding Scheme) level necessary to achieve a predetermined error rate, and so forth may be used.

In adaptive control section 113 of this embodiment, adaptive MCS control is used whereby the modulation method and coding rate are controlled adaptively based on the propagation path state or reception quality. However, the control method used by adaptive control section 113 is not limited to this. Adaptive control section 113 may use adaptive scheduling, whereby a user whose propagation path state or reception quality is comparatively good is selected and data for a selected user is assigned to each time slot, either alone or together with adaptive MCS control.

That is to say, the combination of coding section 101 and coding sections 111-1 through 111-N forms a coding section that codes first data using a coding rate set in common among frequencies, and codes second data using a coding rate set individually for each frequency. Also, the combination of modulation section 102 and modulation sections 112-1 through 112-N forms a modulation section that modulates first data using a modulation method set in common among frequencies, and modulates second data using a modulation method set individually for each frequency. Therefore, a signal modulated using a modulation method set in common among frequencies, and a signal modulated using a modulation method set individually for each frequency, can be multiplexed in the frequency domain. Also, a signal coded using a coding rate set in common among frequencies, and a signal coded using a coding rate set individually for each frequency, can be multiplexed in the frequency domain.

FFT section 103 executes FFT processing on first data modulated by modulation section 102. By means of this processing, first data is converted from a time-domain signal to a frequency-domain signal. First data converted to the frequency domain is composed of K components corresponding respectively to the K frequencies. In this embodiment, FFT processing is used for time-domain to frequency-domain conversion, but conversion processing that can be used is not limited to FFT processing, and it is also possible to use other suitable processing such as DCT (Discrete Cosine Transform) processing or wavelet conversion processing, for example.

Puncture section 104 punctures components corresponding to predetermined frequencies (for example, N frequencies) among the K components making up first data on which FFT processing has been executed. As components corresponding to predetermined frequencies (for example, N frequencies) among the K components are punctured in this way, signal replacement described later herein can be performed without signaling information relating to frequencies corresponding to the punctured components between the transmitter and receiver.

Also, puncture section 104 calculates the total transmission power of components corresponding to predetermined frequencies—that is, punctured components—and outputs the calculated total transmission power to transmission power correction section 105.

When puncturing is performed by puncture section 104, transmission power correction section 105 controls first data transmission power. More specifically, first data transmission power is corrected by increasing the transmission power of first data in which certain components have been punctured so as to become the same as the transmission power assigned to first data beforehand. For example, the total transmission power input from puncture section 104 is added to the transmission power of first data in which certain components have been punctured.

As first data transmission power is controlled when puncturing is performed in this way, error rate characteristics on the receiver side when puncturing is performed can be improved. Also, since the transmission power of first data in which certain components have been punctured is increased so as to become the same as the transmission power assigned to is first data beforehand, the total transmission power of first data can be kept constant, transmission power assigned to first data beforehand can be used efficiently, and receiver error rate characteristics can be improved.

In this embodiment, transmission power correction is performed after puncturing has been performed, but transmission power correction may be performed before puncturing is performed.

In subcarrier assignment section 106, each component of first data for which transmission power has been corrected by transmission power correction section 105 is output directly as a signal assigned to a corresponding subcarrier. On the other hand, second data modulated by modulation sections 112-1 through 112-N is assigned to subcarriers corresponding to punctured components. In other words, subcarrier assignment section 106 maps second data onto frequencies corresponding to punctured components.

That is to say, the combination of puncture section 104 and transmission power correction section 105 forms a replacement section that replaces certain of the K components making up first data on which FFT processing has been executed by second data.

IFFT section 107 executes IFFT processing on first data in which certain components have been replaced by second data. By means of this processing, first data undergoes reverse-conversion from a frequency-domain signal to a time-domain signal. In this embodiment, IFFT processing is used for frequency-domain to time-domain reverse-conversion, but reverse-conversion processing that can be used is not limited to IFFT processing, and it is also possible to use other suitable processing such as inverse DCT processing or inverse wavelet conversion processing, for example.

GI insertion section 108 inserts a GI for reducing the effects of inter-symbol interference in first data on which IFFT processing has been executed. Transmit radio processing section 109 executes predetermined transmission processing such as D/A conversion and up-conversion on first data in which a GI has been inserted, and transmits the signal to a communicating apparatus—that is, radio receiving apparatus 150 in FIG. 2—by means of a single carrier via antenna 110.

Receive radio processing section 118 executes predetermined receive radio processing such as down-conversion and A/D conversion on a radio signal received via antenna 110, and acquires a baseband received signal. Pilot extraction section 117 extracts a pilot signal from the received signal obtained by receive radio processing section 118. Channel estimation section 116 performs channel estimation using the extracted pilot signal. Demodulation section 115 demodulates the received signal obtained by receive radio processing section 118, based on the result of channel estimation by channel estimation section 116. Decoding section 114 decodes the demodulated signal. By means of this decoding, receive data transmitted from radio receiving apparatus 150 is obtained, and channel quality information reported from radio receiving apparatus 150 is acquired.

Radio receiving apparatus 150 in FIG. 2 has antenna 151, receive radio processing section 152, GI removing section 153, FFT section 154, frequency equalization section 155, null subcarrier insertion section 156, IFFT section 157, demodulation section 158, decoding section 159, channel estimation section 160, channel quality measuring section 161, N demodulation sections 162-1, . . . , 162-N, N decoding sections 163-1, . . . , 163-N, coding section 164, modulation section 165, coding section 166, modulation section 167, multiplexing section 168, transmit radio processing section 169, and subcarrier separation section 170.

Receive radio processing section 152 executes predetermined receive radio processing such as down-conversion and A/D conversion on a radio signal received via antenna 151—that is, first data transmitted from radio transmitting apparatus 100 by means of a single carrier. GI removing section 153 removes a GI inserted in first data.

FFT section 154 executes FFT processing on first data on which GI removal has been performed. By means of this processing, first data is converted from a time-domain signal to a frequency-domain signal—that is to say, the converted first data is composed of K components. In this embodiment, FFT processing is used for time-domain to frequency-domain conversion, but conversion processing that can be used is not limited to FFT processing, and it is also possible to use other suitable processing such as DCT processing or wavelet conversion processing, for example.

Channel estimation section 160 extracts a pilot signal multiplexed with first data from which a GI has been removed, and performs channel estimation. As a result of this channel estimation, a propagation path frequency characteristic is acquired.

Frequency equalization section 155 performs frequency-domain equalization processing by multiplying the inverse characteristic of the frequency channel acquired by channel estimation section 160 by first data on which FFT processing has been executed.

Subcarrier separation section 170 extracts components corresponding to first data and second data from among the K components. All extracted components corresponding to first data are output to null subcarrier insertion section 156. Extracted components corresponding to second data (for example, N components) are output to corresponding demodulation sections 162-1 through 162-N.

Null subcarrier insertion section 156 inserts "0" in a frequency (subcarrier) to which extracted second data is assigned. IFFT section 157 executes IFFT processing on first data input from null subcarrier insertion section 156. By means of this processing, first data undergoes reverse-conversion from a frequency-domain signal to a time-domain signal. In this embodiment, IFFT processing is used for frequency-domain to time-domain reverse-conversion, but reverse-conversion processing that can be used is not limited to IFFT processing, and it is also possible to use other suitable processing such as inverse DCT processing or inverse wavelet conversion processing, for example.

Demodulation section 158 demodulates first data on which IFFT processing has been executed, based on the modulation method used by modulation section 102. Decoding section 159 decodes first data demodulated by demodulation section 158, based on the coding rate used by coding section 101.

Demodulation sections 162-1 through 162-N demodulate extracted second data based on the modulation methods used by modulation sections 112-1 through 112-N respectively. Decoding sections 163-1 through 163-N decode second data demodulated by demodulation sections 162-1 through 162-N respectively, based on the coding rates used by coding sections 111-1 through 111-N respectively. Demodulation sections 162-1 through 162-N and decoding sections 163-1 through 163-N perform data demodulation and decoding respectively on a frequency-by-frequency basis.

Channel quality measuring section 161 measure the channel quality of each frequency (subcarrier) onto which second data is mapped —that is, the reception SIR of each frequency—using a pilot signal multiplexed with first data from which a GI has been removed. A measured channel quality is input to coding section 164 as channel quality information, is coded by coding section 164, and is modulated by modulation section 165.

Coding section 166 codes transmit data addressed to radio transmitting apparatus 100. Modulation section 167 modulates transmit data coded by coding section 166. Multiplexing section 168 multiplexes channel quality information modulated by modulation section 165 and transmit data modulated by modulation section 167. The signal obtained by means of this multiplexing undergoes predetermined transmit radio processing such as D/A conversion and up-conversion in transmit radio processing section 169, and is transmitted to radio transmitting apparatus 100 via antenna 151.

Next, signal replacement and transmission power correction operations in radio transmitting apparatus 100 will be described. FIG. 3 shows fluctuations of transmission power for each frequency. Here, a case is described by way of example in which eight frequencies (frequencies f1 through f8) are used, and three frequencies—f2, f5, and f7—are subject to replacement.

Figure 3A:
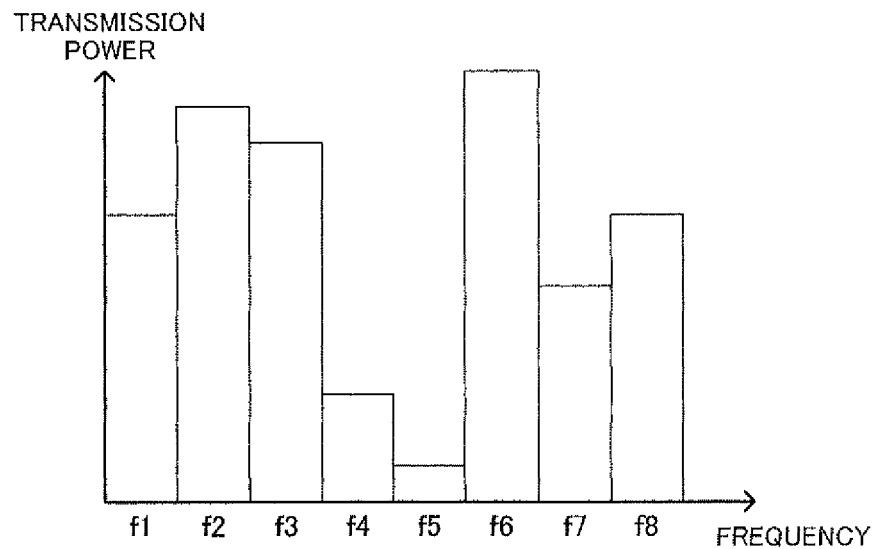
FIG. 3A is a drawing showing the transmission power of first data that has undergone FFT processing in Embodiment 1.
Figure 3B:
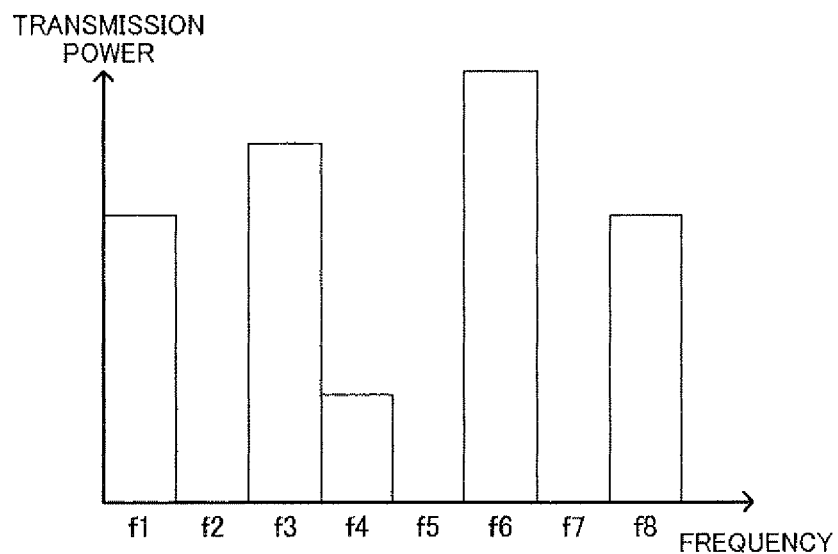
FIG. 3B is a drawing showing the transmission power of first data that has undergone puncturing processing in Embodiment 1.
Figure 3C:
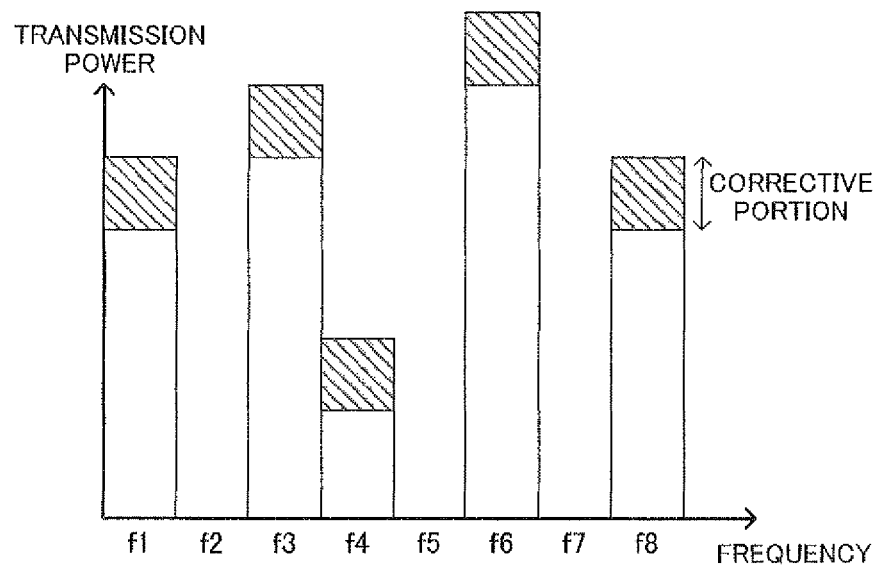
FIG. 3C is a drawing showing the transmission power of first data that has undergone transmission power correction in Embodiment 1.
Figure 3D:
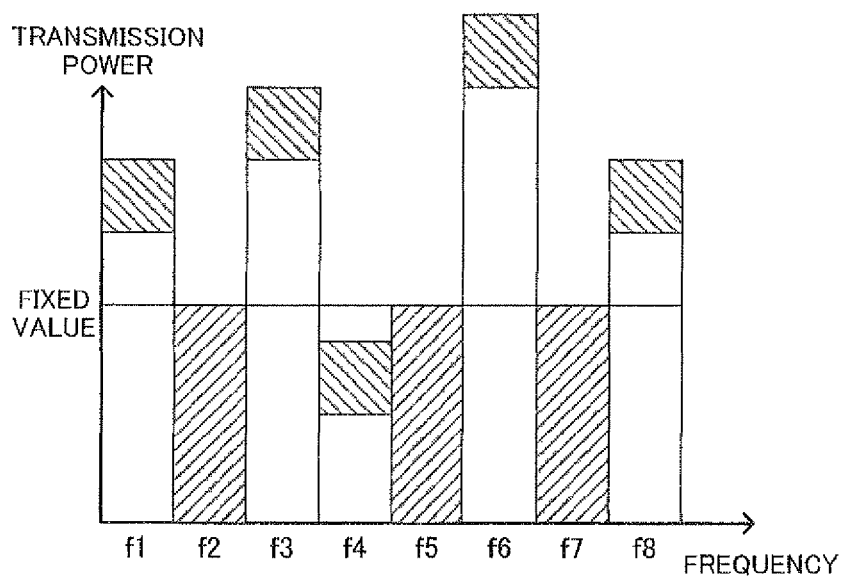
FIG. 3D is a drawing showing the transmission power of first data on which second data has been mapped in Embodiment 1.

First data whose per-frequency transmission power has become as shown in FIG. 3A through FFT processing has frequency f2, f5, and f7 components punctured by means of puncturing processing by puncture section 104, as shown in FIG. 3B. Then transmission power correction section 105 divides the total transmission power of the punctured components into 5 equal parts, for example, and adds the transmission power divided into 5 to each of the frequency f1, f3, f4, f6, and f8 components as corrective-portion transmission power, as shown in FIG. 3C. Subcarrier assignment section 106 then maps second data onto frequencies f2, f5, and f7 assigned to second data, as shown in FIG. 3D. Transmission power is assigned to second data beforehand, and second data mapped onto frequencies f2, f5, and f7 is transmitted at fixed transmission power. First data for which signal replacement has been executed in this way undergoes IFFT processing and is then transmitted by means of a single carrier.

As stated above, when second data is mapped onto a plurality of frequencies (here, three frequencies f2, f5, and f7) among frequencies f1 through f8, second data transmission can be performed using a plurality of frequencies. That is to say, second data can be transmitted by means of multiple carriers at the same time as first data is transmitted by means of a single carrier.

Next, adaptive control by adaptive control section 113 in radio transmitting apparatus 100 will be described with reference to FIG. 4.

Figure 4A:
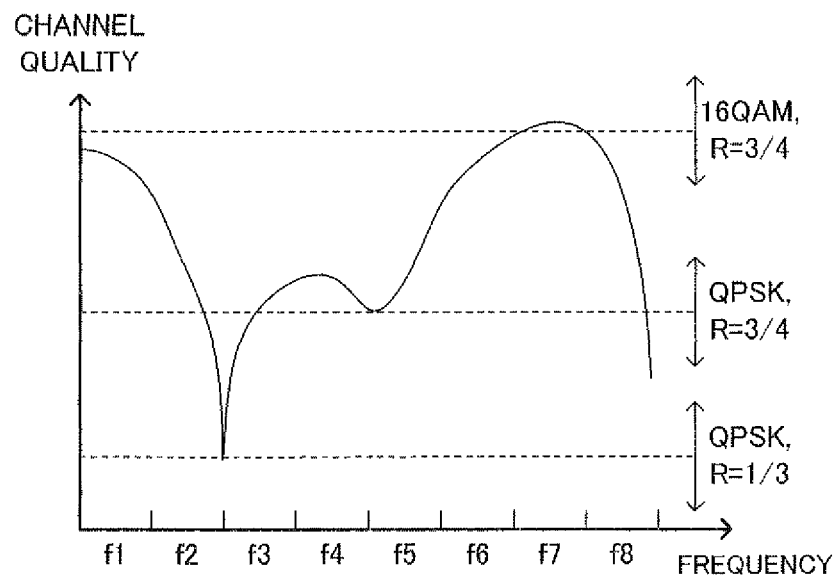
FIG. 4A is a drawing showing the channel quality of each frequency in Embodiment 1.
Figure 4B:
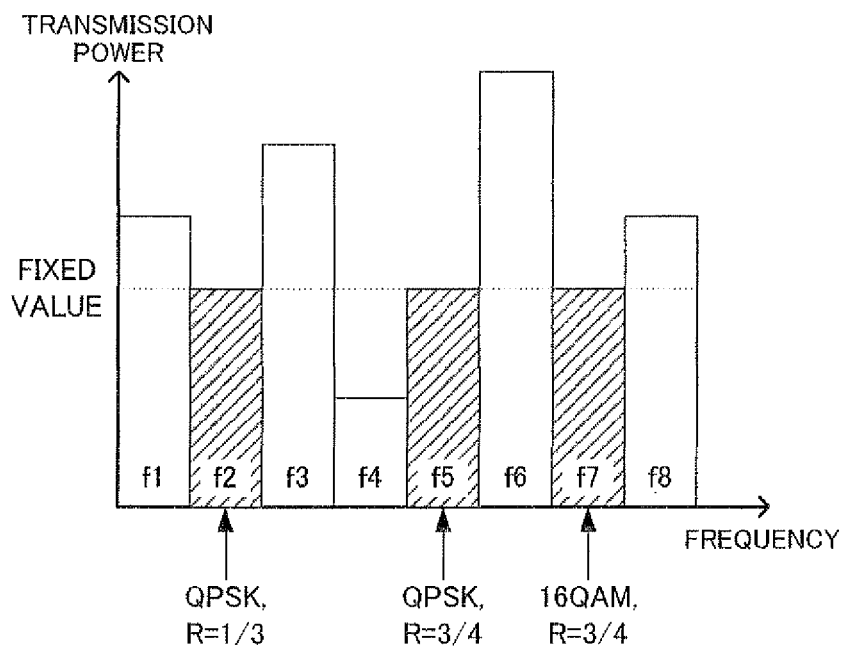
FIG. 4B is a drawing showing modulation/coding methods set based on the channel qualities shown in FIG. 4A.

Assume that the channel quality of each frequency at a certain timing is as shown in FIG. 4A. Adaptive control section 113 references the channel qualities of frequencies f2, f5, and f7 assigned to second data, indicated by the reported channel quality information. In this example, the channel quality of frequency f2 corresponds to a range in which the modulation method is set to QPSK and the coding rate is set to 1/3. Therefore, as shown in FIG. 4B, the use of coding rate R=1/3 is specified for one of coding sections 111-1 through 111-N, and the use of the QPSK modulation method is specified for one of modulation sections 112-1 through 112-N.

Also, the channel quality of frequency f5 corresponds to a range in which the modulation method is set to QPSK and the coding rate is set to 3/4. Therefore, the use of coding rate R=3/4 is specified for another of coding sections 111-1 through 111-N. Also, the use of the QPSK modulation method is specified for another of modulation sections 112-1 through 112-N. The channel quality of frequency f7 corresponds to a range in which the modulation method is set to 16QAM and the coding rate is set to 3/4. Therefore, the use of coding rate R=3/4 is specified for another of coding sections 111-1 through 111-N. Also, the use of the 16QAM modulation method is specified for another of modulation sections 112-1 through 112-N.

In this way, second data is coded and modulated adaptively for each mapped frequency.

Next, the method of determining the number of frequencies (subcarriers) assigned to second data will be described.

Figure 5:
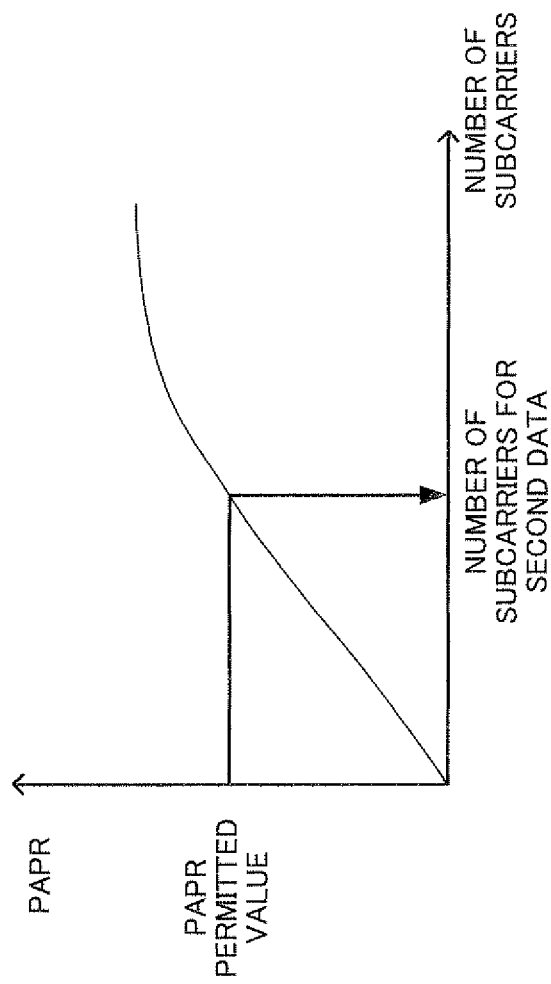
FIG. 5 is a drawing for explaining the method of determining the number of subcarriers assigned to second data in Embodiment 1.

In radio transmitting apparatus 100, the PAPR can be considered to increase as the number of subcarriers assigned to second data is increased. Also, as the number of subcarriers assigned to second data is increased, the number of symbols that can be transmitted by per-subcarrier adaptive modulation and coding increases, enabling throughput to be improved. However, if the PAPR exceeds a certain level, the peak signal is affected by amplifier nonlinear distortion, and the BER characteristic may deteriorate. Thus, in this embodiment, the number of subcarriers assigned to second data is determined beforehand so that the PAPR is less than or equal to a permitted value (PAPR permitted value) in radio transmitting apparatus 100, as shown in FIG. 5. Therefore, puncture section 104 punctures components corresponding to a number of frequencies determined so that the PAPR is less than or equal to the PAPR permitted value. This enables expansion of the amplifier's linear region to be prevented.

Thus, according to this embodiment, in radio transmitting apparatus 100 certain of K components making up first data on which FFT processing has been executed are replaced by second data different from first data. Also, in radio receiving apparatus 150, FFT processing is executed on received first data, second data is extracted from first data on which FFT processing has been executed, and IFFT processing is executed on first data on which FFT conversion has been executed. Consequently, an increase in peak power in single-carrier transmission is suppressed, signals can be multiplexed in the frequency domain on the transmitter side, and signals multiplexed in the frequency domain can be received on the receiver side, thereby enabling throughput to be improved.

In this embodiment, a data acquisition section acquires a signal transmitted by means of a single carrier as first data, acquires a signal transmitted by means of multiple carriers as second data, and multiplexes these and transmits them simultaneously. However, there are a number of possible variations as to what kind of data is treated as first data, and what kind of data is treated as second data.

First data and second data may be originally mutually independent signal sequences, or may originally belong to the same signal sequence and be split into two signal sequences by the data acquisition section. When first data and second data are acquired from one signal sequence, the data acquisition section splits the single signal sequence into two signal sequences—that is, first data and second data—according to the kinds of information belonging to that signal sequence. On the other hand, when first data and second data are acquired from two originally mutually independent signal sequences, the data acquisition section may, for example, acquire a signal transmitted at a fixed transmission rate as first data, and acquire a signal transmitted at a variable transmission rate as second data. Alternatively, for example, a signal transmitted via a guarantee type communication system may be acquired as first data, while a signal transmitted via a best effort type communication system is acquired as second data. Alternatively, for example, a data signal, which is a data channel signal, may be acquired as first data, while a pilot signal, which is a pilot channel signal, is acquired as second data. Alternatively, for example, broadcast data or multicast data, which is a signal addressed to a plurality of users, may be acquired as first data, while unicast data, which is data addressed to an individual user, is acquired as second data. Alternatively, for example, control data may be acquired as first data, while user data is acquired as second data. Examples of signals transmitted at a fixed transmission rate or signals transmitted via a guarantee type communication system include voice signals, video signals, control signals, and so forth, while examples of signals transmitted at a variable transmission rate or signals transmitted via a best effort type communication system include data for Web viewing, file transfer data, and so forth. In this embodiment, a configuration is used in which first data is input to coding section 101, and second data is input to coding sections 111, but a configuration may also be used in which first data is input to coding sections 111, and second data is input to coding section 101.

By this means, it is possible for a signal transmitted at a fixed transmission rate and a signal transmitted at a variable transmission rate to be multiplexed in the frequency domain, for a signal transmitted via a guarantee type communication system and a signal transmitted via a best effort type communication system to be multiplexed in the frequency domain, for a data signal and a pilot signal to be multiplexed in the frequency domain, and for broadcast data or multicast data and data addressed to an individual user to be multiplexed in the frequency domain. In this case, different kinds of data can be transmitted efficiently, and BER characteristics and throughput characteristics can be improved compared with a case in which these data are all transmitted by means of a single carrier or are all transmitted by means of multiple carriers.

For example, when a signal transmitted at a fixed transmission rate and a signal transmitted at a variable transmission rate are multiplexed, the PAPR is not increased by transmitting the signal transmitted at a fixed transmission rate by means of a single carrier, and therefore the necessity of using a high-performance transmitting amplifier with a wide linear region is low compared with a case in which multicarrier transmission is performed. That is to say, transmission can be performed at high transmission power even if a low-performance transmitting amplifier with a narrow linear region is used, enabling overall BER characteristics and throughput characteristics to be improved. Since throughput does not change for a signal transmitted at a fixed transmission rate even if adaptive control is performed, throughput does not fall to a greater extent than when multicarrier transmission is performed.

On the other hand, with a signal transmitted at a variable transmission rate, throughput can be improved to a greater extent than when single-carrier transmission is performed by carrying out per-frequency adaptive control by means of multicarrier transmission.

Also, when broadcast data or multicast data and data addressed to an individual user are multiplexed, the PAPR is not increased by transmitting broadcast data or multicast data by means of a single carrier, and therefore the necessity of using a high-performance transmitting amplifier with a wide linear region is low compared with a case in which multicarrier transmission is performed. That is to say, transmission can be performed at high transmission power even if a low-performance transmitting amplifier with a narrow linear region is used, enabling overall BER characteristics and throughput characteristics to be improved. With broadcast data or multicast data addressed to a plurality of users, considering the fact that the propagation path state differs for each user, an improvement in throughput cannot be expected even if per-frequency adaptive control is performed by means of multicarrier transmission. Consequently, the possibility of throughput falling is low compared with a case in which multicarrier transmission is performed.

On the other hand, with a signal transmitted as data addressed to an individual user, throughput can be improved to a greater extent than when single-carrier transmission is performed by carrying out per-frequency adaptive control by means of multicarrier transmission on an individual user basis.

Radio transmitting apparatus 100 and radio receiving apparatus 150 of this embodiment can be applied to both a base station apparatus and a mobile station apparatus used in a mobile communication system in which single-carrier frequency equalization technology is applied.

(Embodiment 2)

Figure 6:
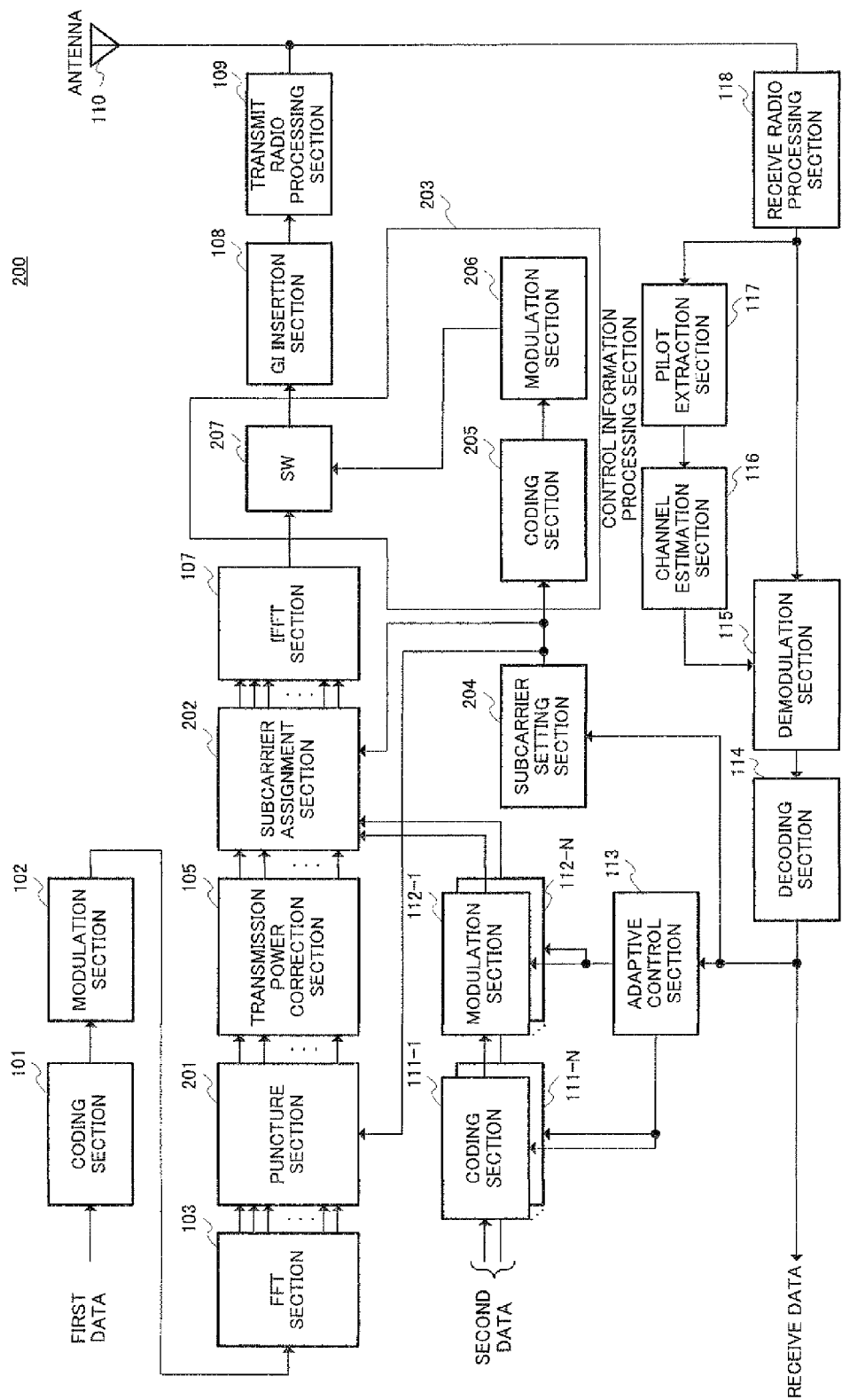
FIG. 6 is a block diagram showing the configuration of a radio transmitting apparatus according to Embodiment 2 of the present invention.
Figure 7:
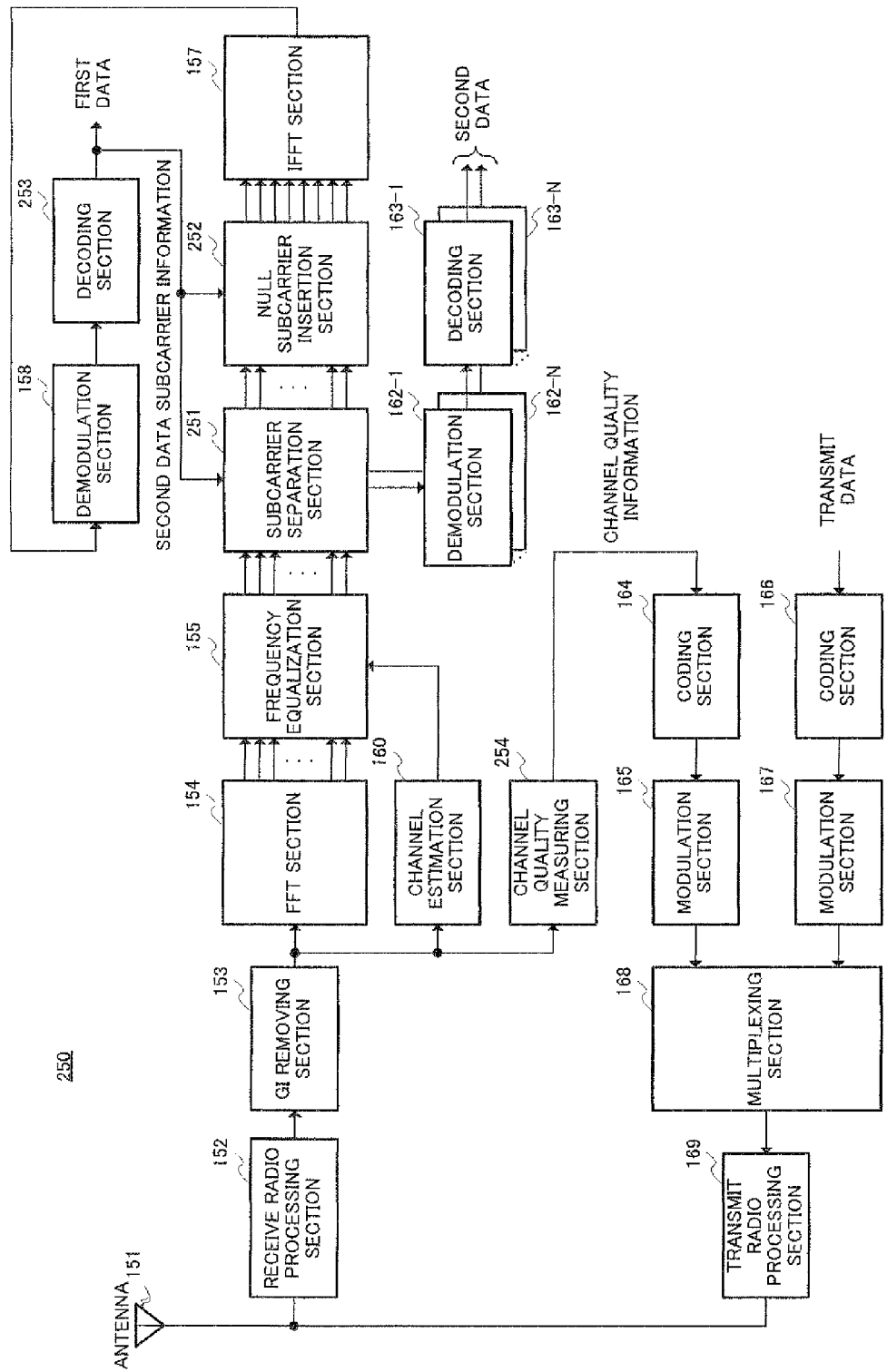
FIG. 7 is a block diagram showing the configuration of a radio receiving apparatus according to Embodiment 2 of the present invention.

FIG. 6 is a block diagram showing the configuration of a radio transmitting apparatus according to Embodiment 2 of the present invention, and FIG. 7 is a block diagram showing the configuration of a radio receiving apparatus that performs radio communication with radio transmitting apparatus 200 in FIG. 6. Radio transmitting apparatus 200 in FIG. 6 and radio receiving apparatus 250 in FIG. 7 have similar basic configurations to those of radio transmitting apparatus 100 and radio receiving apparatus 150 described in Embodiment 1, and therefore identical configuration elements are assigned the same reference numerals, and detailed descriptions thereof are omitted.

Radio transmitting apparatus 200 has puncture section 201 and subcarrier assignment section 202 instead of puncture section 104 and subcarrier assignment section 106 described in Embodiment 1. Also, the configuration of radio transmitting apparatus 200 additionally includes control information processing section 203 and subcarrier setting section 204. Control information processing section 203 has coding section 205, modulation section 206, and switch section 207.

Subcarrier setting section 204 sets subcarriers to be assigned to second data from among K subcarriers, based on channel quality information acquired by decoding section 114. In other words, of the K subcarriers, frequencies of components punctured by puncture section 201 are variably set adaptively based on channel quality information. For example, variable setting is performed so that a frequency is selected whose reception quality is better than a certain level. Set frequencies are reported to puncture section 201, subcarrier assignment section 202, and coding section 205.

Puncture section 201 punctures components corresponding to frequencies reported from subcarrier setting section 204. Puncture section 201 also calculates the total transmission power of components corresponding to the reported frequencies—that is, the total transmission power of punctured components. The calculated total transmission power is then output to transmission power correction section 105.

Each component of first data for which transmission power has been corrected by transmission power correction section 105 is output directly by subcarrier assignment section 202 as a signal assigned to the corresponding subcarrier. On the other hand, second data modulated by modulation sections 112-1 through 112-N is assigned to subcarriers corresponding to punctured components. That is to say, subcarrier assignment section 202 maps second data onto frequencies corresponding to punctured components in accordance with a report from subcarrier setting section 204.

In control information processing section 203, coding section 205 codes information relating to frequencies reported from subcarrier setting section 204 as second data subcarrier information. Modulation section 206 modulates coded second data subcarrier information. Switch section 207 switches a signal to be output to GI insertion section 108 at predetermined timing. By means of this switching, modulated second data subcarrier information and first data on which IFFT processing has been executed are time division multiplexed.

Radio receiving apparatus 250 has a configuration in which, of the configuration elements of radio receiving apparatus 150 described in Embodiment 1, subcarrier separation section 170, null subcarrier insertion section 156, decoding section 159, and channel quality measuring section 161 are replaced by subcarrier separation section 251, null subcarrier insertion section 252, decoding section 253, and channel quality measuring section 254.

Decoding section 253 decodes first data demodulated by demodulation section 158, in the same way as decoding section 159. By means of this decoding, second data subcarrier information multiplexed with first data is acquired.

Among the K first data components on which equalization processing has been executed by frequency equalization section 155, subcarrier separation section 251 extracts and mutually separates components corresponding to frequencies indicated by acquired second data subcarrier information (that is, components corresponding to second data), and other components (that is, components corresponding to first data). All extracted components corresponding to first data are output to null subcarrier insertion section 252. Extracted components corresponding to second data (for example, N components) are output to corresponding demodulation sections 162-1 through 162-N.

Null subcarrier insertion section 252 inserts "0" in a frequency (subcarrier) to which extracted second data is assigned, in accordance with acquired second data subcarrier information.

Channel quality measuring section 254 measures the channel quality of each of the K frequencies, and outputs the measurement results to coding section 164 as channel quality information.

Next, a subcarrier setting operation by subcarrier setting section 204 in radio transmitting apparatus 200 will be described. Here, a case is described by way of example in which eight frequencies (frequencies f1 through f8) are used, and the three subcarriers with the highest channel qualities are selected in high-to-low channel quality order.

Figure 8A:
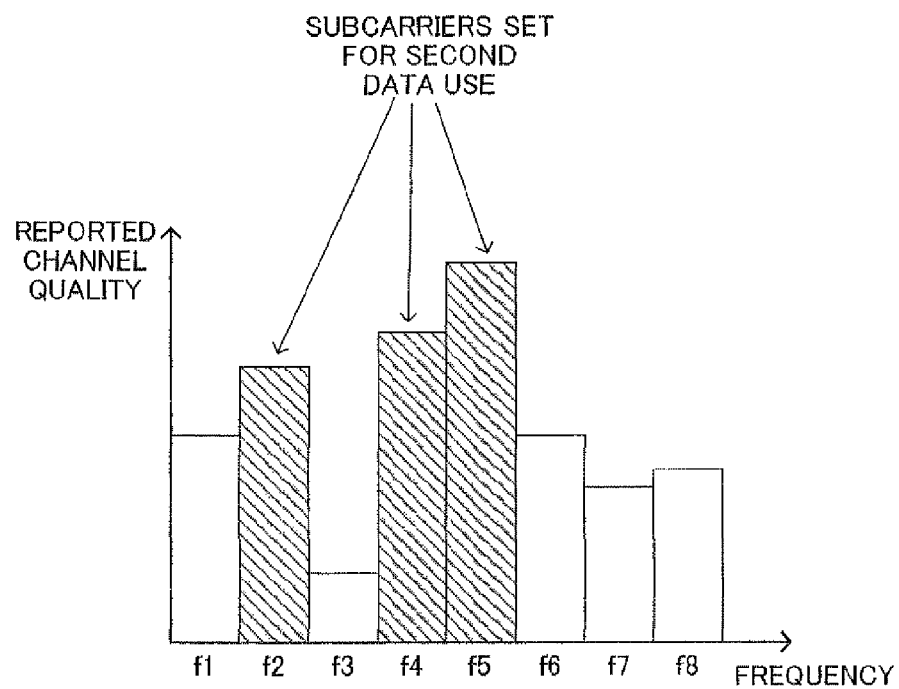
FIG. 8A is a drawing showing an example of set frequencies in Embodiment 2.

If reported frequency channel qualities at a certain timing are as shown in FIG. 8A, frequency f5 with the best channel quality among frequencies f1 through f8, frequency f4 with the second-best channel quality, and frequency f2 with the third-best channel quality, are selected. Thus, frequencies f2, f4, and f5 are set as second data subcarriers.

Figure 8B:
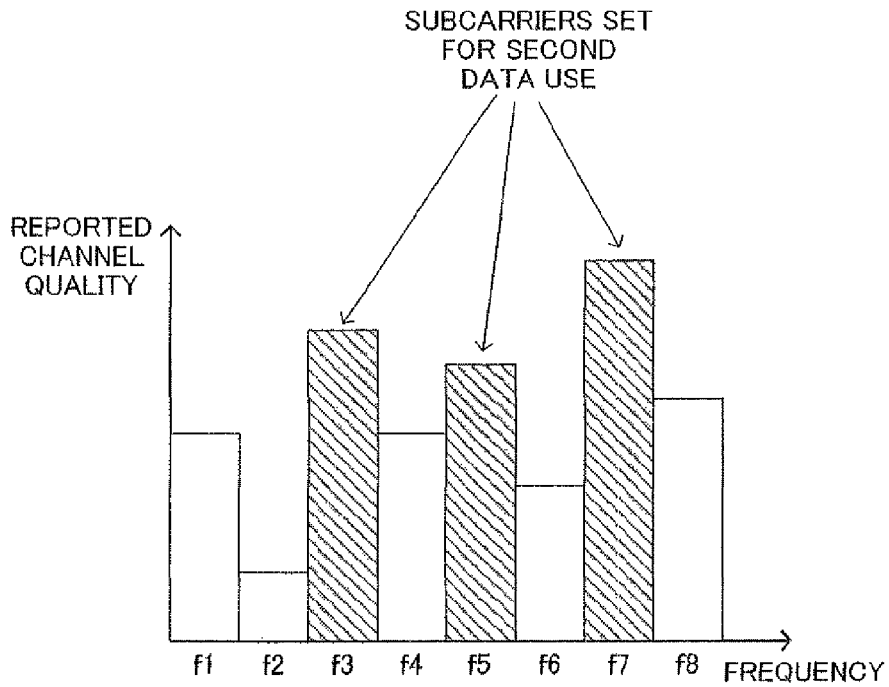
FIG. 8B is a drawing showing another example of set frequencies in Embodiment 2.

Then, if reported frequency channel qualities at the next timing are as shown in FIG. 8B, frequency f7 with the best channel quality among frequencies f1 through f8, frequency f3 with the second-best channel quality, and frequency f5 with the third-best channel quality, are selected. Thus, frequencies f3, f5, and f7 are set as second data subcarriers.

As frequencies having the best channel quality are selected in this way, second data can be mapped onto the frequencies that have the best channel quality, frequencies with the best reception quality can be utilized efficiently, and throughput can be significantly improved. Also, since a predetermined number of frequencies are selected in high-to-low channel quality order, second data can be mapped onto frequencies for which reception quality is comparatively good, frequencies with good reception quality can be utilized efficiently, and throughput can be significantly improved.

As described with reference to FIG. 5 in Embodiment 1, subcarrier setting section 204 determines the number of frequencies to be set so that the PAPR is less than or equal to a PAPR permitted value. As the number of frequencies to be set is determined so that the PAPR does not exceed the permitted value in this way, expansion of the amplifier's linear region can be prevented.

Next, multiplexing of first data and second data subcarrier information performed by control information processing section 203 will be described.

Figure 9:
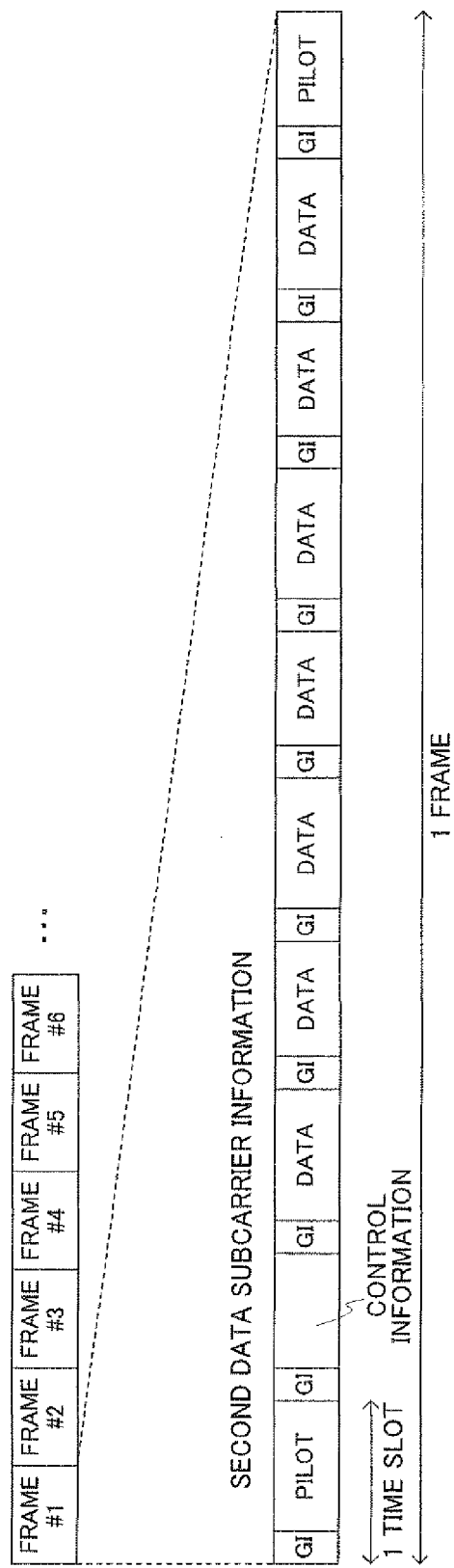
FIG. 9 is a drawing showing a first data frame configuration according to Embodiment 2.

FIG. 9 is a drawing showing the configuration of a first data frame in which second data subcarrier information is multiplexed. In this frame, one time slot is the transmission unit, and one frame is composed of 10 time slots. Second data subcarrier information is updated on a frame-by-frame basis by subcarrier setting section 204. Updated second data subcarrier information is transmitted in a control information time slot located after a pilot signal located at the head of the frame. Thus, second data subcarrier information is transmitted by means of a single carrier in the same way as first data.

Thus, according to this embodiment, among K frequencies corresponding respectively to K components making up first data, frequencies corresponding to components to be punctured are set variably, so that frequencies onto which second data is mapped can be made variable, and when, for example, variable setting is performed so that frequencies with a reception quality better than a certain level are selected, throughput can be significantly improved.

In this embodiment, subcarrier setting section 204 determines the number of frequencies based only on channel quality information, but the method of determining the number of frequencies is not limited to this. For example, subcarrier setting section 204 may measure the quantity of second data acquired by the data acquisition section—either the quantity of second data coded by coding section 111 or the quantity of second data modulated by modulation section 112—and adaptively determine the number of frequencies to be selected according to the measured quantity of data. In this case, when the quantity of second data increases, the number of second data subcarriers can be increased within a range within which the PAPR does not exceed the permitted value, and when the quantity of second data decreases, the number of second data subcarriers can be decreased.

Radio transmitting apparatus 200 and radio receiving apparatus 250 of this embodiment can be applied to both a base station apparatus and a mobile station apparatus used in a mobile communication system in which single-carrier frequency equalization technology is applied.

(Embodiment 3)

Figure 10:
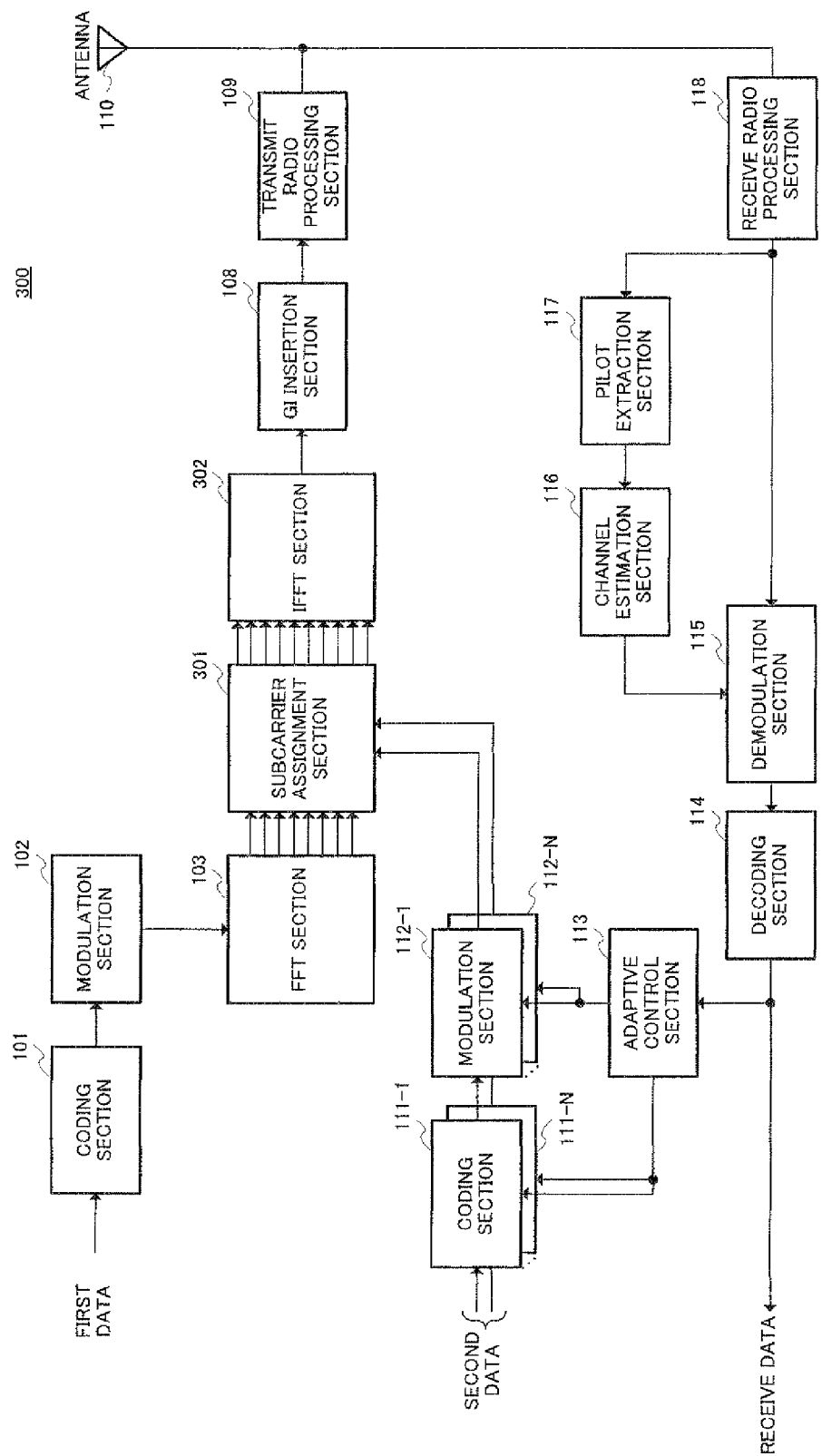
FIG. 10 is a block diagram showing the configuration of a radio transmitting apparatus according to Embodiment 3 of the present invention.
Figure 11:
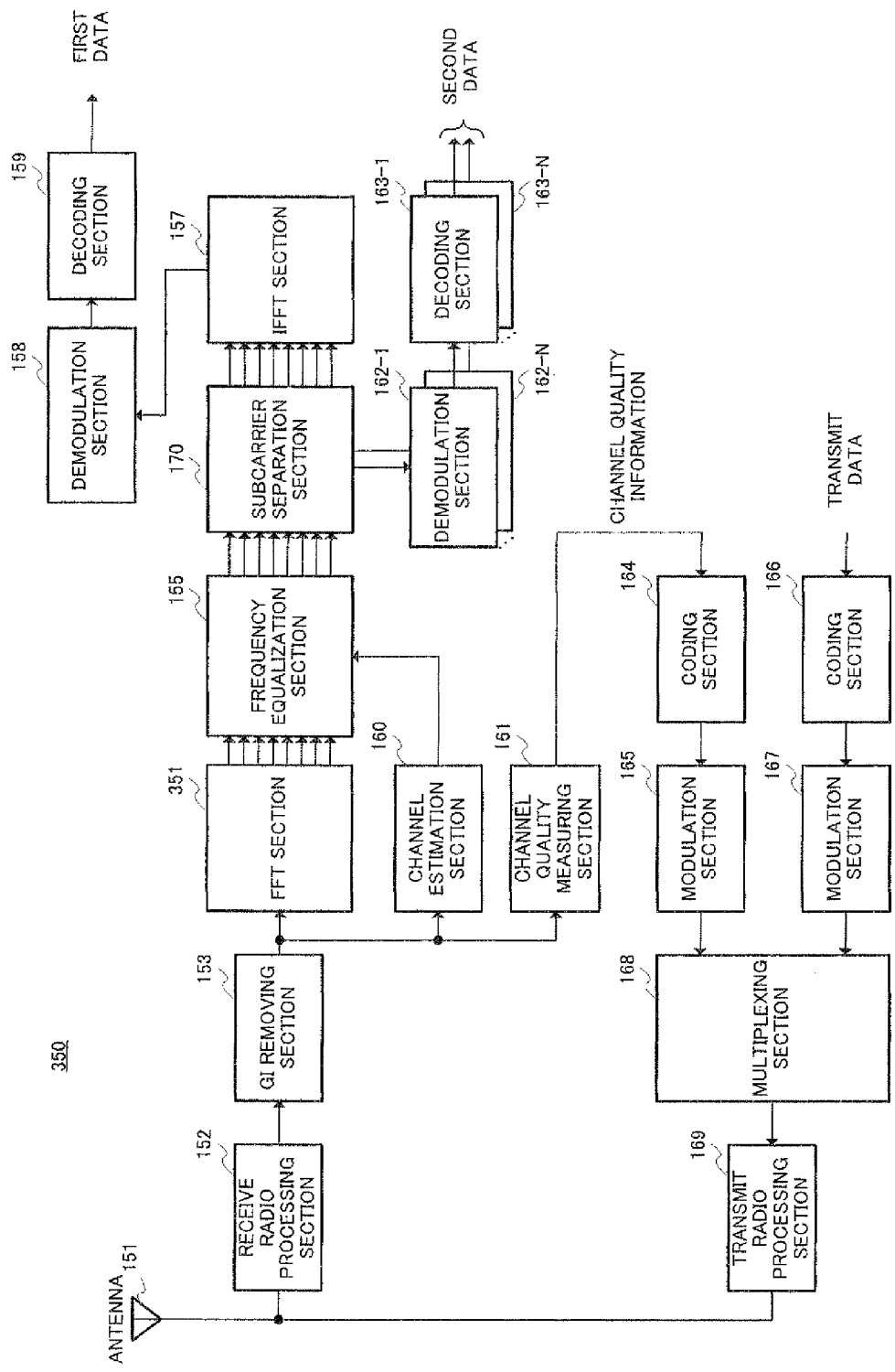
FIG. 11 is a block diagram showing the configuration of a radio receiving apparatus according to Embodiment 3 of the present invention.

FIG. 10 is a block diagram showing the configuration of a radio transmitting apparatus according to Embodiment 3 of the present invention, and FIG. 11 is a block diagram showing the configuration of a radio receiving apparatus that performs radio communication with radio transmitting apparatus 300 in FIG. 10. Radio transmitting apparatus 300 in FIG. 10 and radio receiving apparatus 350 in FIG. 11 have similar basic configurations to those of radio transmitting apparatus 100 and radio receiving apparatus 150 described in Embodiment 1, and therefore identical configuration elements are assigned the same reference numerals, and detailed descriptions thereof are omitted.

The configuration of radio transmitting apparatus 300 does not include puncture section 104 and transmission power correction section 105 described in Embodiment 1, and has subcarrier assignment section 301 instead of subcarrier assignment section 106, and IFFT section 302 instead of IFFT section 107.

Subcarrier assignment section 301 maps K components making up first data on which FFT processing has been executed by FFT section 103, and N second data on which modulation processing has been executed on a frequency-by-frequency basis, onto frequency components of a transmit signal. The mapping method is described later herein.

IFFT section 302 performs IFFT processing on signals mapped onto frequency components by subcarrier assignment section 301. The number of IFFT points in IFFT section 302 is greater than the number of FFT points K of FFT section 103 by the number of second data frequency components N—that is to say, is K+N points.

The configuration of radio receiving apparatus 350 does not include null subcarrier insertion section 156 described in Embodiment 1, and has FFT section 351 instead of FFT section 154.

FFT section 351 executes FFT processing on first data on which GI removal has been performed by GI removing section 153. By means of this processing, first data is converted from a time-domain signal to a frequency-domain signal. As the number of IFFT points of IFFT section 157 is K while the number of FFT points of FFT section 351 is K+N, the converted first data is composed of K+N components.

Next, the mapping method used by subcarrier assignment section 301 of radio transmitting apparatus 300 will be described. A case will be described by way of example in which K=8 and N=8.

Figure 12:
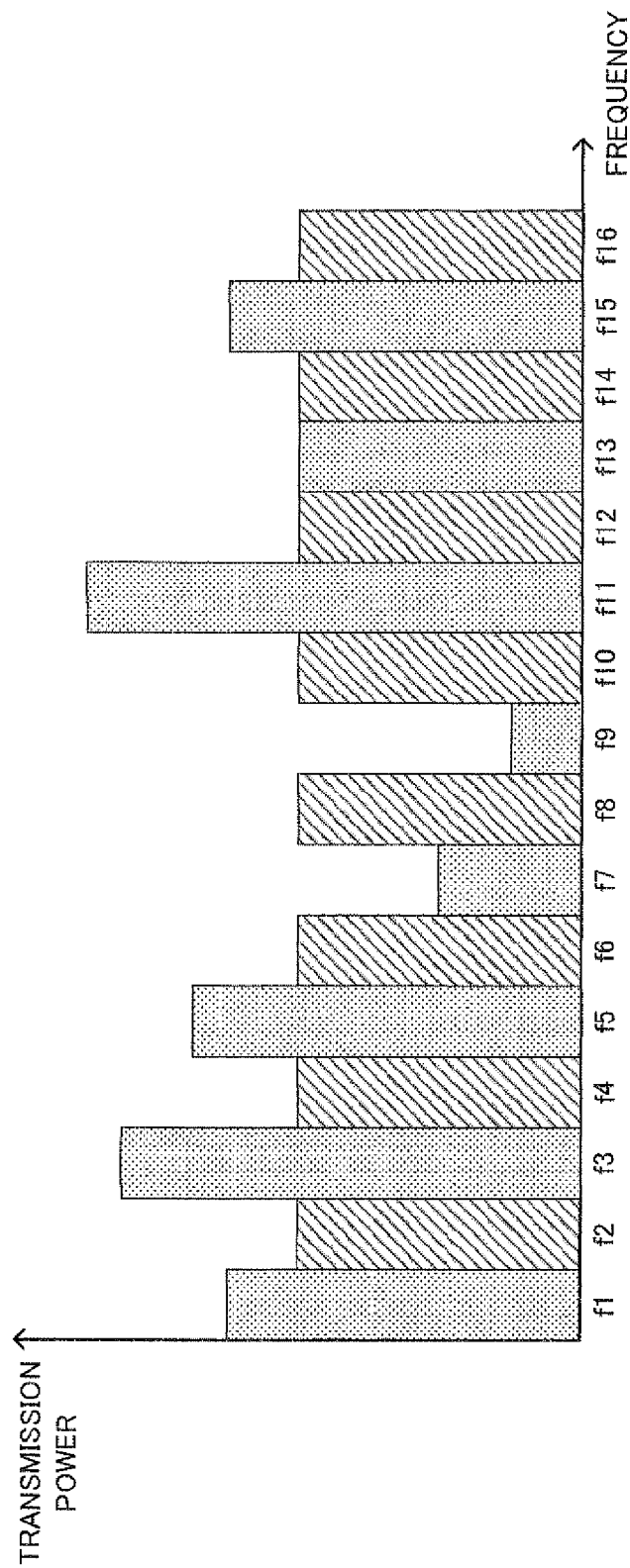
FIG. 12 is a drawing for explaining the mapping method of a subcarrier assignment section according to Embodiment 3 of the present invention.

First, assume that the per-frequency transmission power of first data on which FFT processing has been executed by FFT section 103 is as shown in FIG. 3A. The signal shown in FIG. 3A on which FFT processing has been executed, and eight signals modulated on an individual frequency component basis, are input to subcarrier assignment section 301. Subcarrier assignment section 301 maps these signals onto frequency components (f1 through f16) as shown in FIG. 12, for example. In this example, first data components and second data components are mapped alternately on the frequency axis.

Figure 13A:
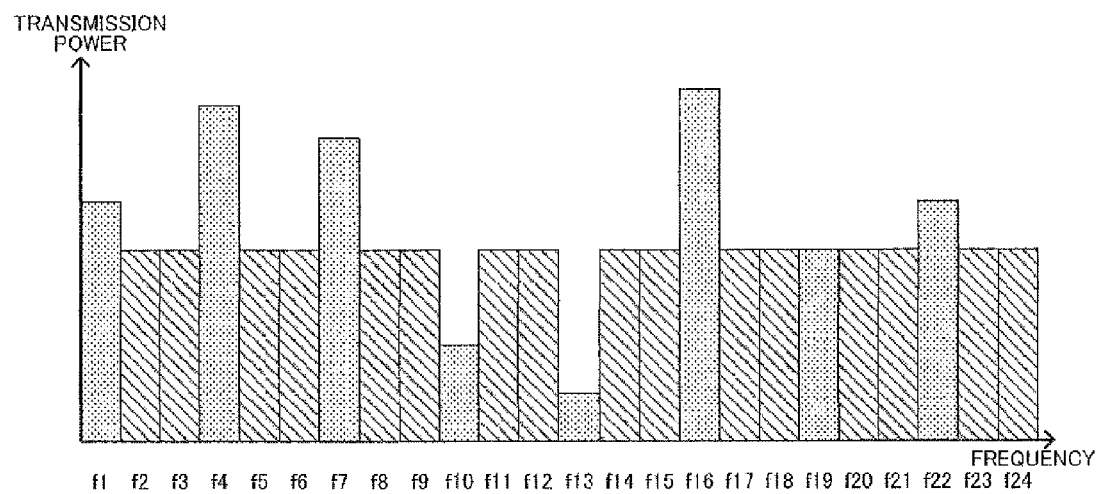
FIG. 13A is a drawing showing a first sample variant of a mapping method according to Embodiment 3 of the present invention.
Figure 13B:
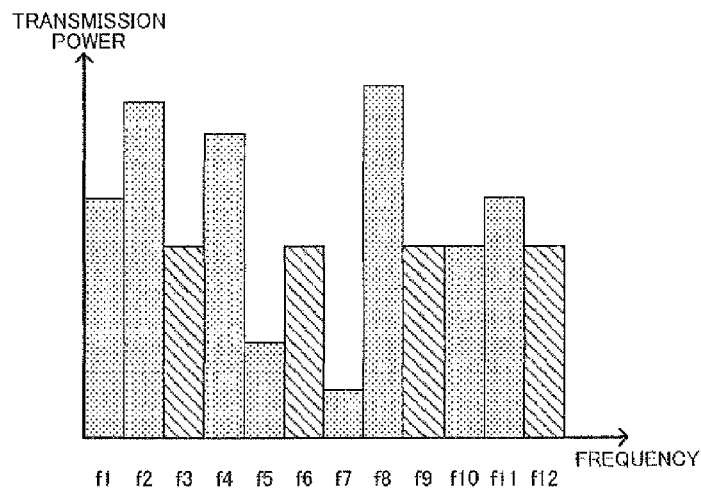
FIG. 13B is a drawing showing a second sample variant of a mapping method according to Embodiment 3 of the present invention.
Figure 13C:
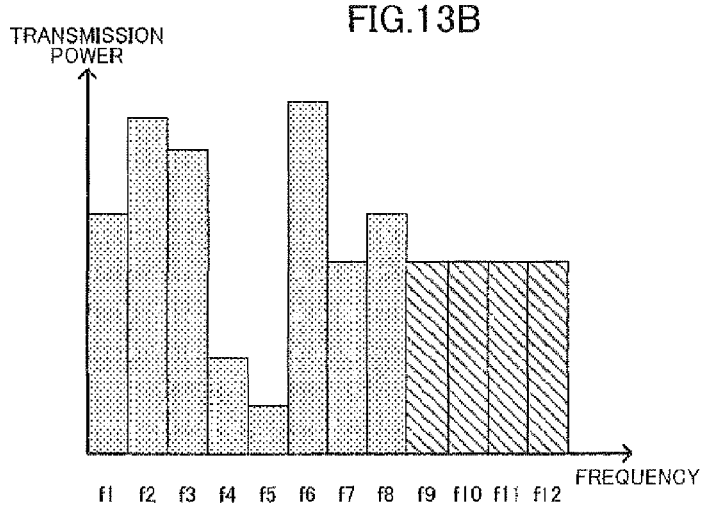
FIG. 13C is a drawing showing a third sample variant of a mapping method according to Embodiment 3 of the present invention.

The mapping method is not limited to that described above. For example, one first data component and a plurality of second data components may be mapped alternately on the frequency axis, as shown in FIG. 13A (in this example, K=8 and N=16). Alternatively, a plurality of first data components and one second data component may be mapped alternately on the frequency axis, as shown in FIG. 13B (in this example, K=8 and N=4). Or first data components may be mapped on the low-region side of the entire band, while second data components are mapped on the high-region side of the entire band, as shown in FIG. 13C (in this example, K=8 and N=4).

Thus, according to this embodiment, second data is inserted without first data frequency components being punctured, and therefore the K frequency components making up first data are transmitted intact. This enables degradation of first data transmission quality to be prevented.

When first data is mapped so as to appear cyclically on the frequency axis, as shown in FIG. 12 for example, a first data component in a time waveform after IFFT processing by IFFT section 302 is a time repeating waveform. Therefore, in radio transmitting apparatus 300, a multiplexing section may be provided between IFFT section 302 and GI insertion section 108 that multiplexes second data—that is, a multicarrier signal time signal—with respect to a signal in which a post-modulation first data time waveform is repeated a plurality of times.

Also, frequency components for mapping second data may be selected as described in Embodiment 2. In this case, the same kind of effect can be obtained as in Embodiment 2.

(Embodiment 4)

In above Embodiments 1 through 3, cases have been described in which a base station is assumed as a radio transmitting apparatus and a mobile station is assumed as a radio receiving apparatus, but in Embodiment 4 of the present invention, a case will be described in which a mobile station is assumed as a radio transmitting apparatus and a base station is assumed as a radio receiving apparatus.

Figure 14:
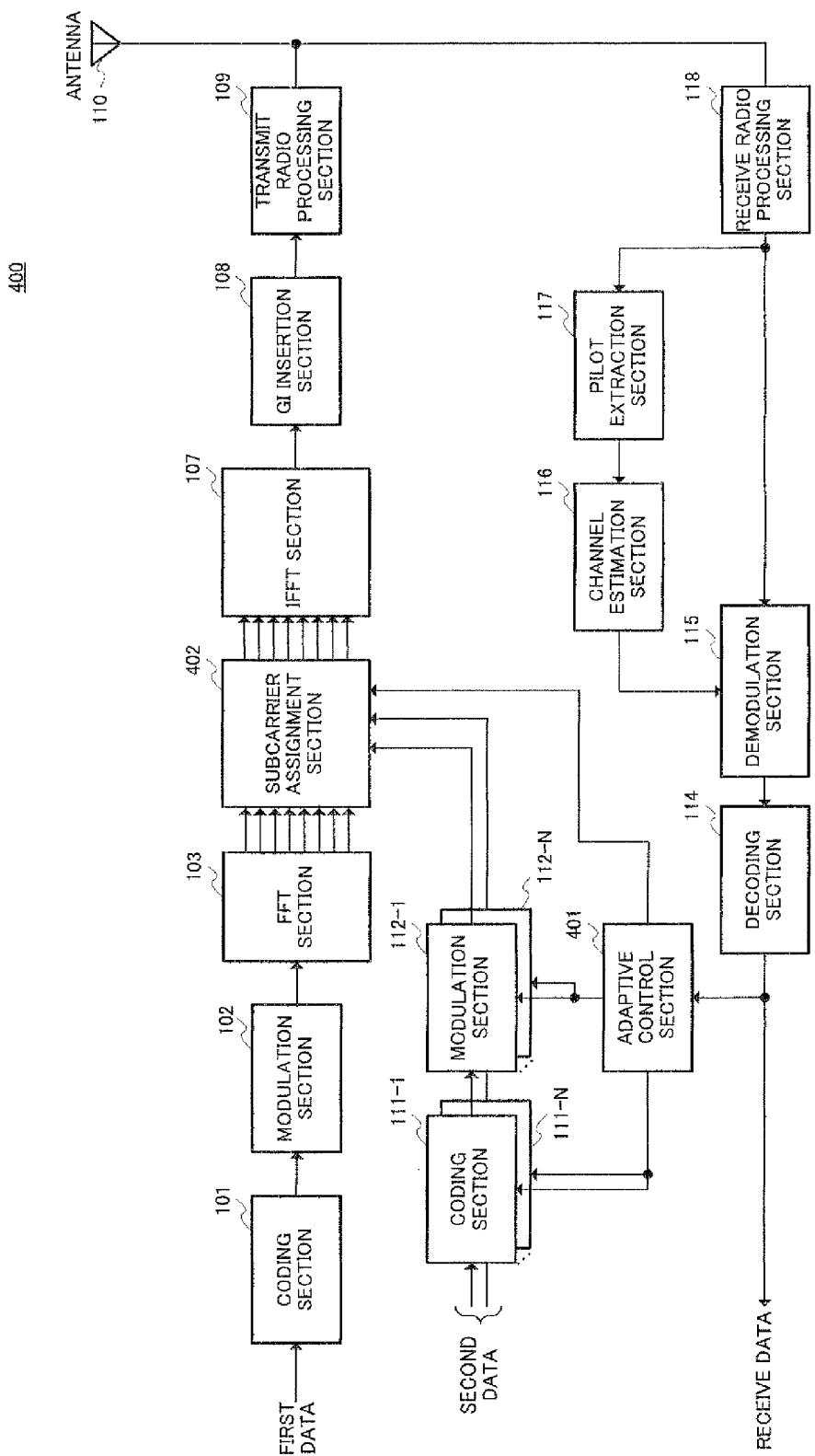
FIG. 14 is a block diagram showing the configuration of a radio transmitting apparatus according to Embodiment 4 of the present invention.
Figure 15:
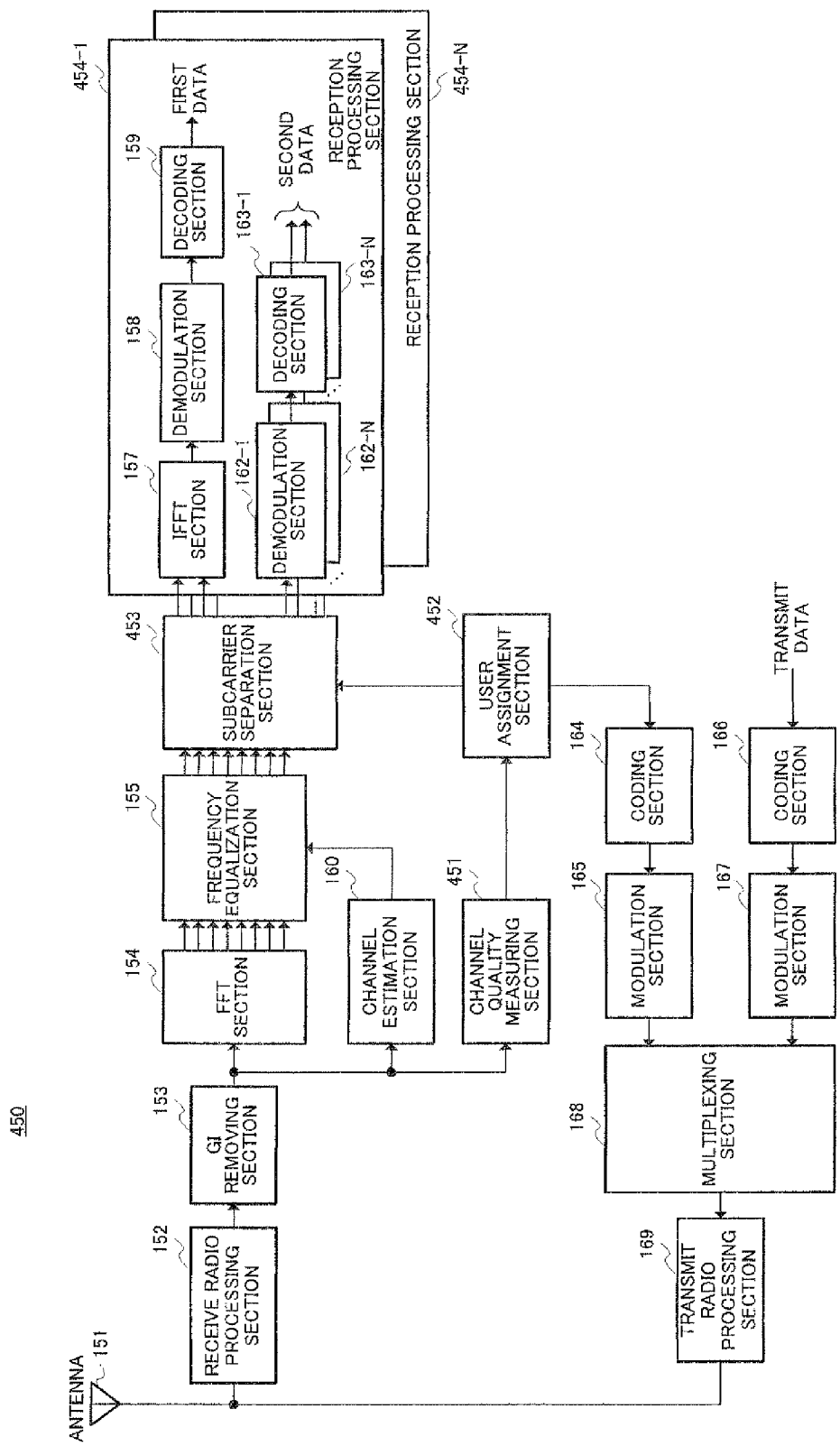
FIG. 15 is a block diagram showing the configuration of a radio receiving apparatus according to Embodiment 4 of the present invention.

FIG. 14 is a block diagram showing the configuration of a radio transmitting apparatus according to Embodiment 4 of the present invention, and FIG. 15 is a block diagram showing the configuration of a radio receiving apparatus that performs radio communication with radio transmitting apparatus 400 in FIG. 14.

Radio transmitting apparatus 400 has adaptive control section 401 and subcarrier assignment section 402 instead of adaptive control section 113 and subcarrier assignment section 106 described in Embodiment 1.

Adaptive control section 401 extracts second data transmission parameters (information on the coding rate, modulation method, and subcarriers used) from decoded data, sets the extracted coding rate in coding sections 111-1 through 111-N, sets the modulation method in modulation sections 112-1 through 112-N, and sets the subcarriers used in subcarrier assignment section 402.

Subcarrier assignment section 402 assigns second data to the subcarriers set by adaptive control section 401, and assigns first data to the other subcarriers.

Radio receiving apparatus 450 has a configuration that has channel quality measuring section 451 and subcarrier separation section 453 instead of channel quality measuring section 161 and subcarrier separation section 170 described in Embodiment 1, and additionally includes user assignment section 452, and reception processing sections 454-1 through 454-N. Reception processing sections 454-1 through 454-N each have IFFT section 157, demodulation section 158, decoding section 159, demodulation sections 162-1 through 162-N, and decoding sections 163-1 through 163-N.

Using a pilot signal multiplexed with first data on which GI removal has been performed, channel quality measuring section 451 measures the channel quality of each subcarrier to which second data has been assigned—that is, per-frequency reception quality (for example, reception SIR or the like)—on a user-by-user basis. A measured channel quality is input to user assignment section 452 as channel quality information.

Based on the reception quality of each subcarrier measured on a user-by-user basis, user assignment section 452 assigns first data and second data on a user-by-user basis, and also assigns the subcarriers, coding rate, and modulation method used on a user-by-user basis. These items of assignment information are input to coding section 164 as transmission parameters, and subcarrier assignment information is also input to subcarrier separation section 453. Details of the first data and second data assignment method and the subcarrier assignment method will be given later herein.

Subcarrier separation section 453 separates subcarriers on which frequency domain equalization has been executed into per-user first data and second data according to subcarrier assignment information, and inputs the separated first data and second data into per-user reception processing sections 454-1 through 454-N.

Reception processing sections 454-1 through 454-N correspond respectively to user #1 through user #N, and in each reception processing section, IFFT, demodulation, and decoding processing is performed for first data, and receive data is obtained. Also, demodulation and decoding processing is performed for second data, and receive data is obtained.

Next, the first data and second data allocation method used in above-described user assignment section 452 will be explained. User assignment section 452 regards a user whose reception quality measured by channel quality measuring section 451 is high as having a margin of transmission power for a reason such as being near a base station, and assigns second data (an OFDM signal) to such a user. On the other hand, user assignment section 452 regards a user whose reception quality is low as having no margin of transmission power for a reason such as not being near a base station, and assigns first data (a single-carrier signal) to such a user.

Specifically, second data is assigned if the average reception SIR of all subcarriers measured by channel quality measuring section 451 is greater than or equal to a predetermined threshold value (for example, 15 dB), and first data is assigned if that average is less than the threshold value.

In this way, the effects of signal distortion due to high peak power are small for a user with a margin of transmission power, enabling high throughput to be achieved by performing OFDM transmission. For a user with no margin of transmission power, since reception quality degrades due to the effects of signal distortion if high peak power is present, reception quality can be improved by performing single-carrier transmission.

User assignment section 452 may also assign second data (an OFDM signal) to a user whose transmit data quantity is large, and assign first data (a single-carrier signal) to a user whose transmit data quantity is small. Assignment may also be performed by data type—for example, assigning first data to a user that transmits control data, and assigning second data to a user that transmits packet data. First data and second data may be assigned simultaneously to a user that transmits control data and packet data.

Next, the subcarrier assignment method used in above-described user assignment section 452 will be explained. Here, a case is considered in which subcarriers are assigned to four users, user #1 through user #4, and it is assumed that user #1 and user #3 are located midway between a base station and cell edge, user #2 is located near the cell edge, and user #4 is located near the base station.

Figure 16:
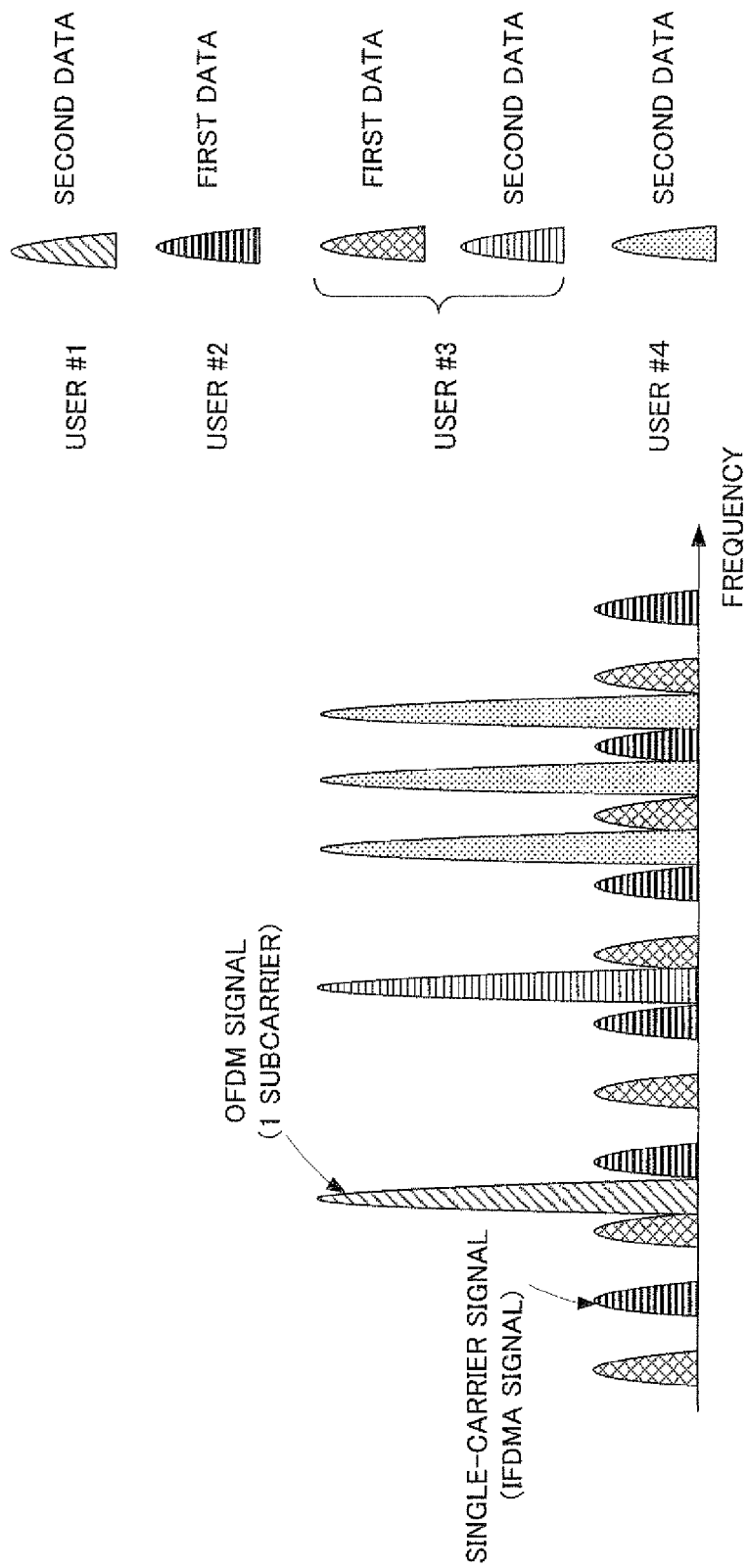
FIG. 16 is a drawing for explaining the subcarrier assignment method of a user assignment section according to Embodiment 4 of the present invention.

First, a case will be described in which the IFDMA method is used for single-carrier transmission. IFDMA is a method whereby user multiplexing is performed on the frequency domain by using bands distributed on a user-by-user basis, and the IFDMA principle enables an increase in the PAPR to be prevented. As shown in FIG. 16, first data (single-carrier signals) assigned to user #2 and user #3 are assigned to subcarriers at equal intervals set for each user. Also, for second data (OFDM signals) assigned to user #1, user #3 and user #4, subcarriers with good reception quality are assigned to each user. Max CIR or suchlike scheduling is used for second data assignment. An OFDM signal may be assigned to one subcarrier or to a plurality of subcarriers.

Figure 17:
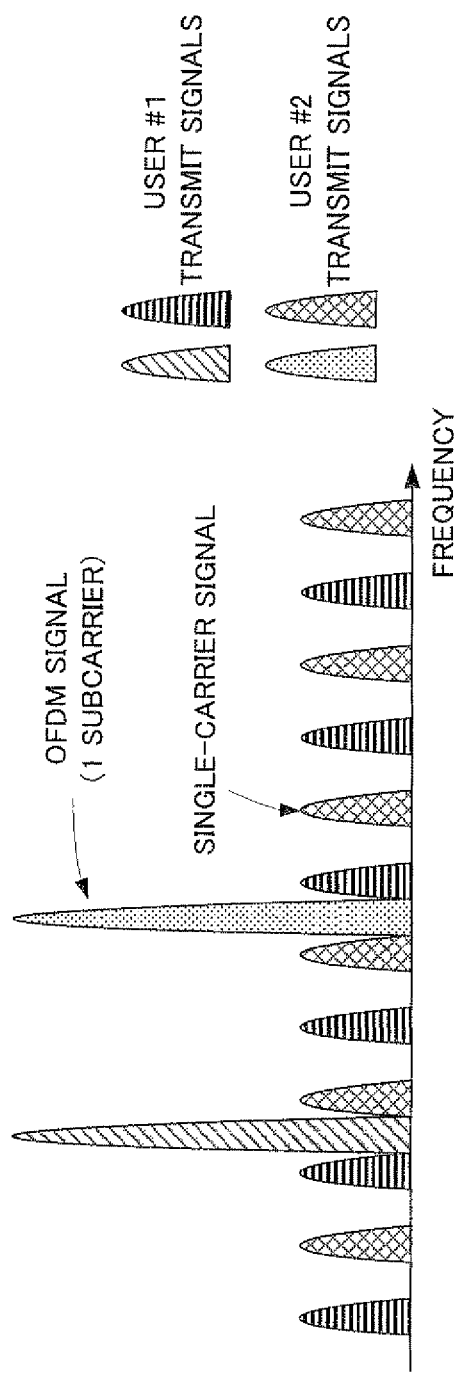
FIG. 17 is a drawing for explaining the subcarrier multiplexing method of a user assignment section according to Embodiment 4 of the present invention.

Here, methods of multiplexing a single-carrier signal and OFDM signal will be described. A first multiplexing method is shown in FIG. 17. In this figure, equally spaced subcarriers are assigned to user #1 and user #2 first data (single-carrier signals), and a subcarrier between components used for single-carrier signals is assigned to second data (an OFDM signal). The multiplexing method shown in FIG. 16 is also similar to the first multiplexing method shown in FIG. 17.

Figure 18:
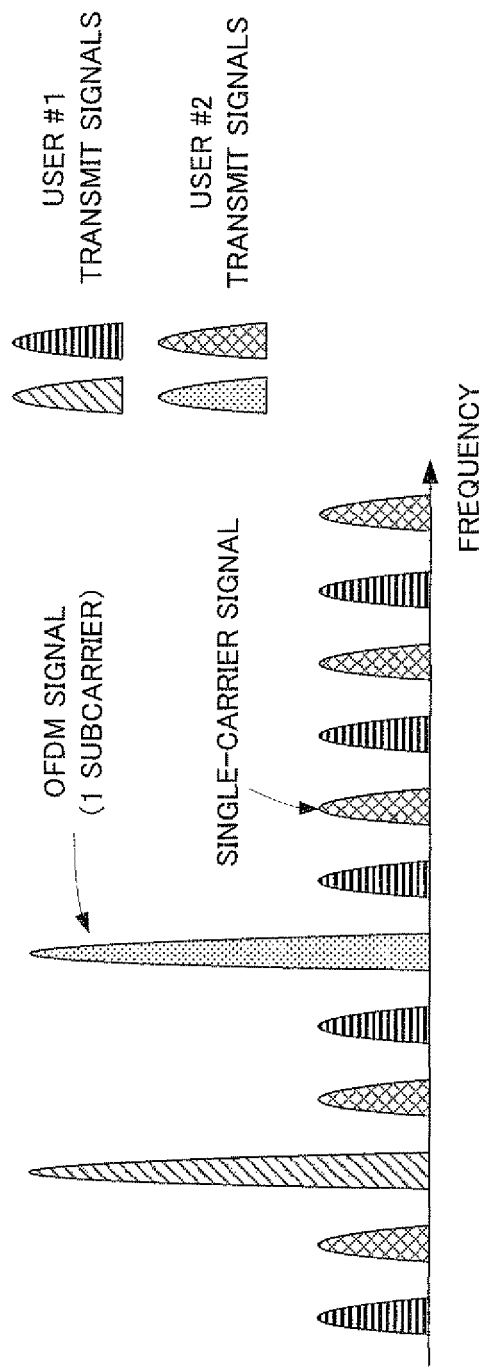
FIG. 18 is a drawing for explaining the subcarrier multiplexing method of a user assignment section according to Embodiment 4 of the present invention.
Figure 19:
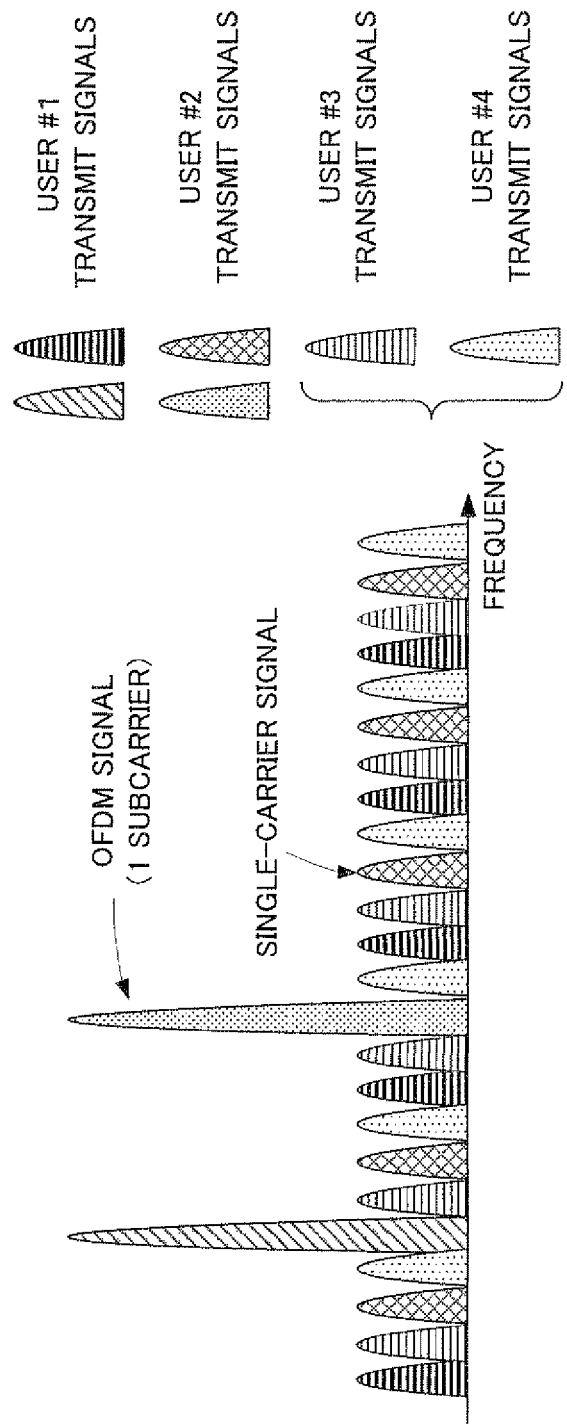
FIG. 19 is a drawing for explaining the subcarrier multiplexing method of a user assignment section according to Embodiment 4 of the present invention.

A second multiplexing method is shown in FIG. 18. In this figure, equally spaced subcarriers are assigned to user #1 and user #2 first data (single-carrier signals), and a subcarrier of part of a single-carrier signal is substituted for assignment to second data (an OFDM signal). By this means, as shown in FIG. 19, other users (user #3 and user #4) can further be multiplexed in components to which a signal is not assigned in FIG. 18, and the accommodated number of users can be increased. Here, it is assumed that user #3 and user #4 transmit only single-carrier signals.

Figure 20:
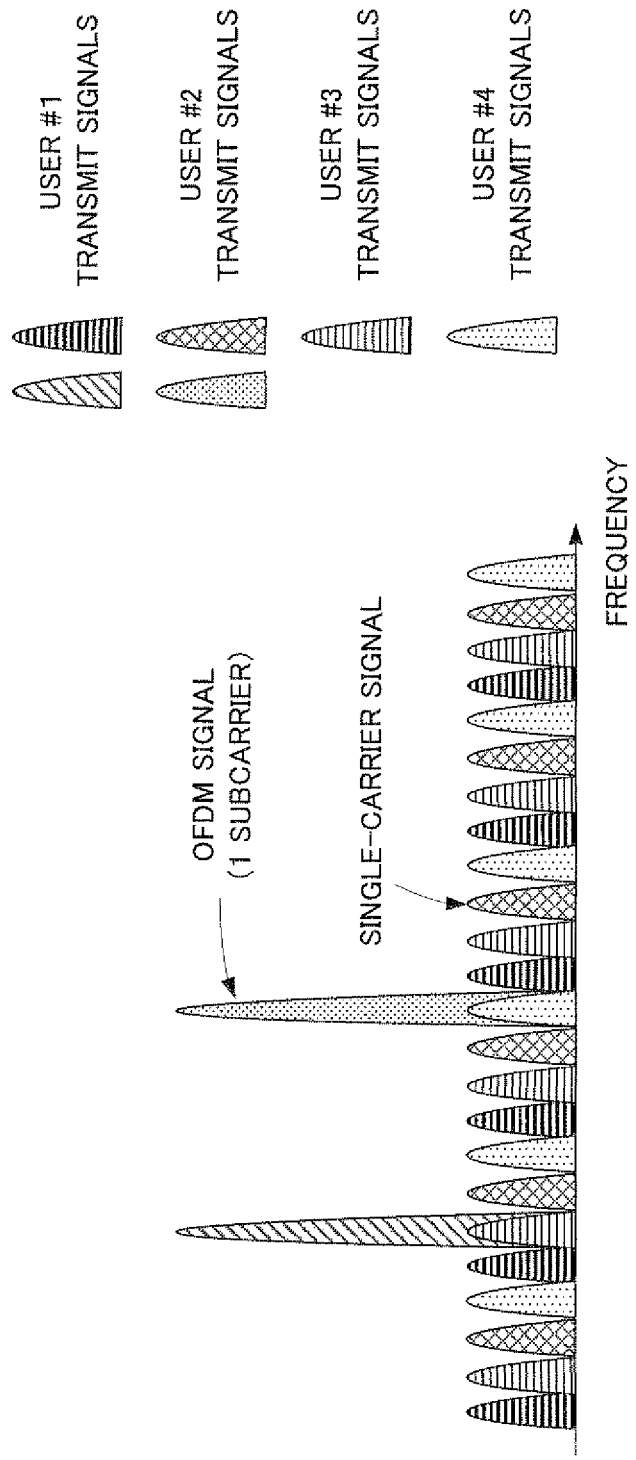
FIG. 20 is a drawing for explaining the subcarrier multiplexing method of a user assignment section according to Embodiment 4 of the present invention.

A third multiplexing method is shown in FIG. 20. In this figure, equally spaced subcarriers are assigned to user #1 and user #2 first data (single-carrier signals), and the same subcarrier as a subcarrier of part of a single-carrier signal of another user is assigned to second data (an OFDM signal). By this means, it is possible to omit notification of non-transmission of that subcarrier only to another user that transmits a single-carrier signal.

Here, in the third multiplexing method, since an OFDM signal and single-carrier signal are multiplexed in the same subcarrier, it is possible that interference may occur between these signals, but with regard to interference received by an OFDM signal from a single-carrier signal, considering the fact that power per single-carrier signal subcarrier is small, interference superimposed on an OFDM signal is small in the first place. Also, if an OFDM signal of a different user is assigned to a subcarrier for which the single-carrier signal power has fallen (for example, a subcarrier with a reception quality difference of 10 dB or more), interference can be further decreased. On the other hand, with regard to interference received by a single carrier signal from an OFDM signal, when a single-carrier signal is demodulated in a radio receiving apparatus (base station), the effects of interference can be reduced by performing demodulation with a subcarrier to which an OFDM signal of another user is assigned replaced by 0 (null).

Figure 21:
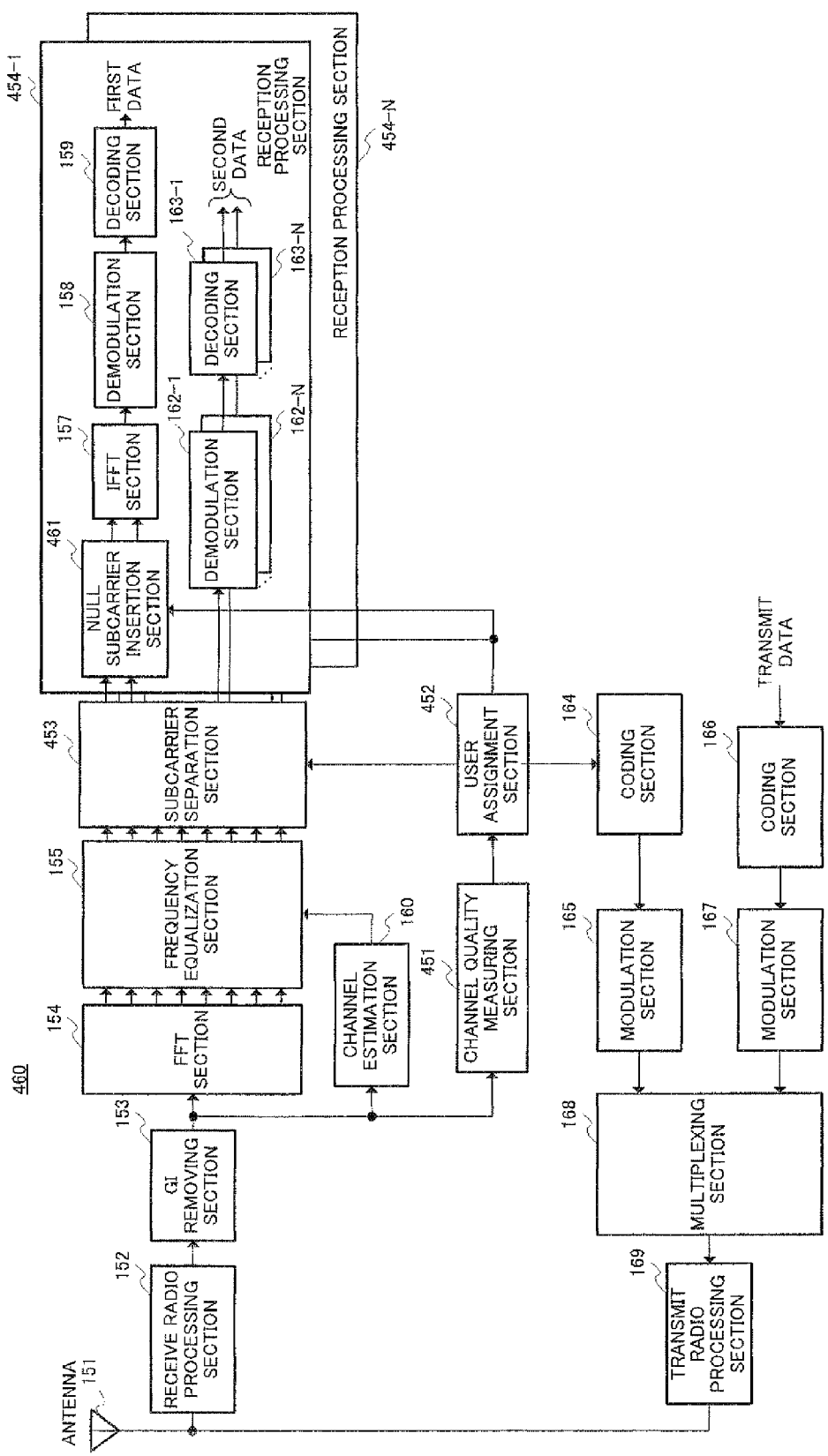
FIG. 21 is a block diagram showing the configuration of a radio receiving apparatus according to Embodiment 4 of the present invention.

At this time, the configuration of a radio receiving apparatus (base station) 460 is as shown in FIG. 21, being equipped with a null subcarrier insertion section 461. Null subcarrier insertion section 461 inserts null in a subcarrier to which an OFDM signal of another user is assigned.

Thus, according to this embodiment, a single-carrier signal and OFDM signal can be multiplexed and transmitted between users in an uplink also, enabling an increase in the PAPR of each user in a base station to be suppressed, and system throughput to be improved.

Figure 22:
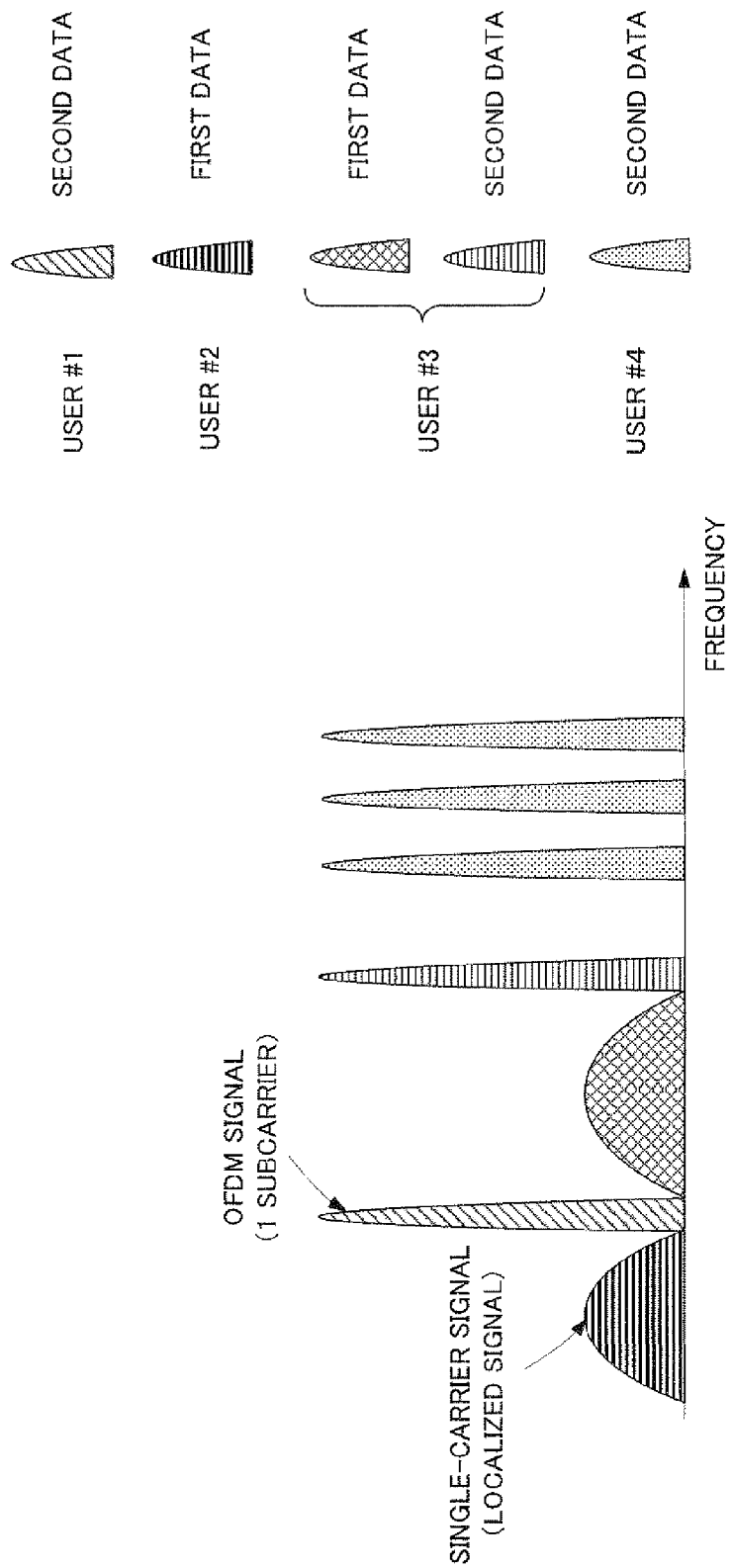
FIG. 22 is a drawing illustrating frequency assignment when a Localized FDMA method is used.

In this embodiment, a case has been described in which an IFDMA method is used for single-carrier transmission, but a Localized FDMA method may also be used whereby user multiplexing is performed on the frequency domain by using bands localized for each user, as shown in FIG. 22.

In this embodiment, a case has been described in which reception processing is performed on a user-by-user basis in a radio receiving apparatus, but as reception timing may differ for each user, FFT processing and frequency equalization processing may also be performed on a user-by-user basis.

In the above embodiments, second data has been described as being adaptively modulated, but the present invention is not limited to this, and may be similarly implemented when second data is not adaptively modulated.

In the above embodiments, in order to reduce the PAPR, information with a small quantity of data may be transmitted as second data, and information with a large quantity of data may be transmitted as first data.

In the above embodiments, cases have been described by way of example in which the present invention is configured as hardware, but it is also possible for the present invention to be implemented by software.

The function blocks used in the descriptions of the above embodiments are typically implemented as LSIs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The adaptation of biotechnology or the like is also a possibility.

A first aspect of the present invention is a radio transmitting apparatus that transmits a mutually different first signal and second signal, and has: a conversion section that executes time-domain to frequency-domain conversion on a first signal; a mapping section that maps a first signal on which conversion has been executed and a second signal onto mutually different frequencies; a reverse-conversion section that executes frequency-domain to time-domain reverse-conversion on a signal generated by mapping by the mapping section; and a transmitting section that transmits a signal on which reverse-conversion has been executed by means of a single carrier.

According to this configuration, signals can be multiplexed in the frequency domain while suppressing an increase in peak power in single-carrier transmission, and throughput can be improved.

A second aspect of the present invention is a radio transmitting apparatus wherein, in the above-described configuration, the mapping section replaces a frequency component among a plurality of frequency components making up a first signal on which conversion has been executed by a second signal.

A third aspect of the present invention is a radio transmitting apparatus wherein, in an above-described configuration, the mapping section has: a puncturing section that punctures a frequency component among a plurality of frequency components making up a first signal on which conversion has been executed; and an assignment section that assigns a second signal to a frequency corresponding to a punctured frequency component.

According to this configuration, operational effects similar to those described above can be achieved by puncturing a frequency component among a plurality of frequency components making up a first signal, and mapping a second signal onto a frequency component corresponding to a punctured frequency component.

A fourth aspect of the present invention is a radio transmitting apparatus wherein, in an above-described configuration, a control section is further provided that controls the transmission power of a first signal when puncturing is performed by the puncturing section.

According to this configuration, since the transmission power of a first signal is controlled when puncturing is performed, error rate characteristics on the receiver side when puncturing is performed can be improved.

A fifth aspect of the present invention is a radio transmitting apparatus wherein, in an above-described configuration, the control section increases the transmission power of a first signal in which a frequency component has been punctured so as to become the same as the transmission power assigned to a first signal beforehand.

According to this configuration, since the transmission power of a first signal in which a frequency component has been punctured is increased so as to become the same as the transmission power assigned to a first signal beforehand, the total transmission power of a first signal can be kept constant, transmission power assigned to first data beforehand can be used efficiently, and receiver error rate characteristics can be improved.

A sixth aspect of the present invention is a radio transmitting apparatus wherein, in an above-described configuration, the puncturing section punctures a frequency component corresponding to a predetermined frequency among the plurality of frequency components.

According to this configuration, since a frequency component corresponding to a predetermined frequency is punctured among a plurality of frequency components making up a first signal, signal replacement can be performed without signaling information relating to a frequency corresponding to a punctured component between the transmitter and receiver.

A seventh aspect of the present invention is a radio transmitting apparatus wherein, in an above-described configuration, the puncturing section punctures frequency components corresponding to a number of frequencies determined beforehand based on a predetermined permitted value for the maximum peak to average power ratio.

According to this configuration, since frequency components corresponding to a number of frequencies determined beforehand based on a predetermined permitted value for the maximum peak to average power ratio are punctured, expansion of the amplifier's linear region can be prevented when the number of frequencies is determined so that the PAPR does not exceed the permitted value, for example.

An eighth aspect of the present invention is a radio transmitting apparatus wherein, in an above-described configuration, a setting section is further provided that variably sets a frequency corresponding to a frequency component punctured by the puncturing section among a plurality of frequencies corresponding to the plurality of frequency components.

According to this configuration, since a frequency corresponding to a punctured frequency component punctured is set variably from among a plurality of frequencies corresponding to a plurality of frequency components making up a first signal, a frequency onto which a second signal is mapped among a plurality of frequencies can be made variable, and when, for example, variable setting is performed so that a frequency with a reception quality better than a certain level is selected, throughput can be significantly improved.

A ninth aspect of the present invention is a radio transmitting apparatus wherein, in an above-described configuration, an acquisition section is further provided that acquires the channel quality of each of the plurality of frequencies, and the setting section selects a frequency having the best channel quality among the acquired channel qualities.

According to this configuration, since a frequency having the best channel quality among the channel qualities of a plurality of frequencies is selected, a second signal can be mapped onto a frequency having the best channel quality, and throughput can be significantly improved.

A tenth aspect of the present invention is a radio transmitting apparatus wherein, in an above-described configuration, an acquisition section is further provided that acquires the channel quality of each of the plurality of frequencies, and the setting section selects a predetermined number of frequencies among the plurality of frequencies in high-to-low acquired channel quality order.

According to this configuration, since a predetermined number of frequencies are selected from among a plurality of frequencies in high-to-low acquired channel quality order, a second signal can be mapped onto frequencies for which reception quality is comparatively good among a plurality of frequencies, frequencies with good reception quality can be utilized efficiently, and throughput can be significantly improved.

An eleventh aspect of the present invention is a radio transmitting apparatus wherein, in an above-described configuration, the setting section determines the number of frequencies to be set based on a predetermined permitted value for the maximum peak to average power ratio.

According to this configuration, since the number of frequencies to be set is determined based on a predetermined permitted value for the maximum peak to average power ratio—that is, PAPR—expansion of the amplifier's linear region can be prevented when the number of frequencies is determined so that the PAPR does not exceed the permitted value, for example.

A twelfth aspect of the present invention is a radio transmitting apparatus wherein, in an above-described configuration, a data acquisition section is further provided that acquires a signal to be transmitted at a fixed transmission rate as a first signal, and acquires a signal to be transmitted at a variable transmission rate as a second signal.

According to this configuration, a signal to be transmitted at a fixed transmission rate and a signal to be transmitted at a variable transmission rate can be multiplexed in the frequency domain.

A thirteenth aspect of the present invention is a radio transmitting apparatus wherein, in an above-described configuration, a data acquisition section is further provided that acquires a signal that transmits control information as a first signal, and acquires a signal that transmits user data as a second signal.

According to this configuration, a signal that transmits' control information and a signal that transmits user data can be multiplexed in the frequency domain.

A fourteenth aspect of the present invention is a radio transmitting apparatus wherein, in an above-described configuration, a data acquisition section is further provided that acquires multicast data or broadcast data as a first signal, and acquires unicast data as a second signal.

According to this configuration, broadcast data or multicast data, which is a signal addressed to a plurality of users, and unicast data, which is data addressed to an individual user, can be multiplexed in the frequency domain.

A fifteenth aspect of the present invention is a radio transmitting apparatus wherein, in an above-described configuration, a data acquisition section is further provided that acquires a signal to be transmitted via a guarantee type communication system as a first signal, and acquires a signal to be transmitted via a best effort type communication system as a second signal.

According to this configuration, a signal to be transmitted via a guarantee type communication system and a signal to be transmitted via a best effort type communication system can be multiplexed in the frequency domain.

A sixteenth aspect of the present invention is a radio transmitting apparatus wherein, in an above-described configuration, a data acquisition section is further provided that acquires a signal to be transmitted by means of a single carrier as a first signal, and acquires a signal to be transmitted by means of multiple carriers as a second signal.

According to this configuration, a signal to be transmitted by means of a single carrier and a signal to be transmitted by means of multiple carriers can be multiplexed in the frequency domain.

A seventeenth aspect of the present invention is a radio transmitting apparatus wherein, in an above-described configuration, a data acquisition section is further provided that acquires a data signal as a first signal, and acquires a pilot signal as a second signal.

According to this configuration, a data signal and a pilot signal can be multiplexed in the frequency domain.

An eighteenth aspect of the present invention is a radio transmitting apparatus wherein, in an above-described configuration, a modulation section is further provided that modulates a first signal using a modulation method set in common among frequencies, and modulates a second signal using a modulation method set individually on a frequency-by-frequency basis.

According to this configuration, a signal modulated using a modulation method set in common among frequencies and a signal modulated using a modulation method set individually on a frequency-by-frequency basis can be multiplexed in the frequency domain.

A nineteenth aspect of the present invention is a radio transmitting apparatus wherein, in an above-described configuration, a coding section is further provided that codes a first signal using a coding rate set in common among frequencies, and codes a second signal using a coding rate set individually on a frequency-by-frequency basis.

According to this configuration, a signal coded using a coding rate set in common among frequencies and a signal coded using a coding rate set individually on a frequency-by-frequency basis can be multiplexed in the frequency domain.

A twentieth aspect of the present invention is a radio transmitting apparatus wherein, in an above-described configuration, the mapping section inserts a second signal in a first signal on which conversion has been executed.

According to this configuration, a first signal and second signal can be multiplexed in the frequency domain without puncturing any of a plurality of frequency components making up a first signal, and degradation of first signal quality can be prevented.

A twenty-first aspect of the present invention is a radio receiving apparatus that has: a receiving section that receives a signal that is transmitted by means of a single carrier and is generated by mapping a mutually different first signal and second signal onto mutually different frequencies; a conversion section that executes time-domain to frequency-domain conversion on a received signal; an extraction section that extracts a first signal and a second signal from a received signal on which conversion has been executed; and a reverse-conversion section that executes frequency-domain to time-domain reverse-conversion on an extracted first signal.

According to this configuration, signals multiplexed in the frequency domain can be received while suppressing an increase in peak power in single-carrier transmission, and throughput can be improved.

A twenty-second aspect of the present invention is a radio receiving apparatus wherein, in an above-described configuration, the receiving section receives single-carrier signals and OFDM signals transmitted from a plurality of users.

According to this configuration, signals in which single-carrier signals and OFDM signals transmitted from a plurality of users are multiplexed in the frequency domain can be received.

A twenty-third aspect of the present invention is a radio receiving apparatus wherein, in an above-described configuration, an assignment section is further provided that assigns single-carrier signals and OFDM signals on a user-by-user basis.

According to this configuration, by assigning single-carrier signals and OFDM signals on a user-by-user basis, single-carrier signals and OFDM signals transmitted from a plurality of users can be multiplexed in the frequency domain.

A twenty-fourth aspect of the present invention is a radio receiving apparatus wherein, in an above-described configuration, the assignment section assigns an OFDM signal to a user whose received signal reception quality is greater than or equal to a predetermined threshold value, and assigns a single-carrier signal to a user whose reception quality is less than the threshold value.

A twenty-fifth aspect of the present invention is a radio receiving apparatus wherein, in an above-described configuration, the assignment section assigns a single-carrier signal or an OFDM signal according to the data quantity or data type of data transmitted from a user.

According to these configurations, since throughput can be improved by assigning an OFDM signal, and reception quality can be improved by assigning a single-carrier signal, a single-carrier signal or OFDM signal can be assigned as appropriate according to the reception quality, data quantity, and data type.

A twenty-sixth aspect of the present invention is a radio receiving apparatus wherein, in an above-described configuration, the assignment section performs superimposed assignment of an OFDM signal of another user to a frequency component of part of a single-carrier signal of a certain user.

According to this configuration, it is not necessary for non-transmission to be set for a single-carrier signal of a frequency component on which an OFDM signal is superimposed, and therefore it is possible to omit notification of non-transmission of this single-carrier signal to a user that transmits this single-carrier signal.

A twenty-seventh aspect of the present invention is a radio receiving apparatus wherein, in an above-described configuration, the assignment section assigns an IFDMA signal that has a spectrum spread at equal intervals as a single-carrier signal.

According to this configuration, an increase in peak power in single-carrier transmission can be suppressed by means of the IFDMA principle.

A twenty-eighth aspect of the present invention is a radio communication base station apparatus that has an above-described radio receiving apparatus.

According to this configuration, signals multiplexed in the frequency domain can be received while suppressing an increase in peak power in single-carrier transmission, and throughput can be improved.

A twenty-ninth aspect of the present invention is a radio transmitting method that transmits a mutually different first signal and second signal, and has: a conversion step of executing time-domain to frequency-domain conversion on a first signal; a mapping step of mapping a first signal on which conversion has been executed and a second signal onto mutually different frequencies; a reverse-conversion step of executing frequency-domain to time-domain reverse-conversion on a signal generated by mapping; and a transmitting step of transmitting a signal on which reverse-conversion has been executed by means of a single carrier.

According to this method, signals can be multiplexed in the frequency domain while suppressing an increase in peak power in single-carrier transmission, and throughput can be improved.

A thirtieth aspect of the present invention is a radio receiving method that has: a receiving step of receiving a signal that is generated by mapping a mutually different first signal and second signal onto mutually different frequencies and is transmitted by means of a single carrier; a conversion step of executing time-domain to frequency-domain conversion on a received signal; an extraction step of extracting a first signal and a second signal from a received signal on which conversion has been executed; and a reverse-conversion step of executing frequency-domain to time-domain reverse-conversion on an extracted first signal.

According to this method, signals multiplexed in the frequency domain can be received while suppressing an increase in peak power in single-carrier transmission, and throughput can be improved.

The present application is based on Japanese Patent Application No. 2004-221587 filed on Jul. 29, 2004, Japanese Patent Application No. 2005-064183 filed on Mar. 8, 2005, and Japanese Patent Application No. 2005-210253 filed on Jul. 20, 2005, entire content of which is expressly incorporated herein by reference.

Industrial Applicability

A radio transmitting apparatus and radio receiving apparatus of the present invention are suitable for use in a base station apparatus or mobile station apparatus used in a mobile communication system in which single-carrier frequency equalization technology is applied, or the like.

The invention claimed is:

1. A transmitting apparatus comprising:
a receiving section configured to receive assignment information;
a data processing section configured to perform data processing for first data and second data based on the assignment information; and
a transmitting section configured to transmit said first data and second data,
wherein said data processing section comprises:
a first modulation section configured to modulate the first data;
a second modulation section configured to modulate the second data;
a conversion section configured to convert the modulated first data from a time-domain to a frequency-domain;
a mapping section configured to map, to subcarriers in the frequency domain, the first data that is output from the conversion section and the second data that is output from the second modulation section without passing through the conversion section; and
a reverse-conversion section that reverse converts the mapped first data and the mapped second data from the frequency-domain to the time-domain, wherein:
the mapping section maps the first data to subcarriers localized in the frequency-domain.

2. The transmitting apparatus according to claim 1, wherein the assignment information indicates that at least one of the first data and the second data is assigned to the radio transmitting apparatus.

3. The transmitting apparatus according to claim 1, wherein the assignment information indicates that at least one of the first data and the second data is assigned to the radio transmitting apparatus, and the assignment information further indicates a coding rate, modulation scheme, and subcarriers for said at least one of the first data and the second data that is assigned.

4. The transmitting apparatus according to claim 1, wherein the first data is a single-carrier signal, and the second data is an orthogonal frequency division multiplexing (OFDM) signal.

5. A receiving apparatus comprising:
an assigning section configured to assign at least one of first data and second data to a transmitting apparatus;
a transmitting section configured to transmit assignment information to the transmitting apparatus; and
a receiving section configured to receive said at least one of the first data and the second data transmitted from the transmitting apparatus,
wherein, said receiving section receives said at least one of the first data and the second data, which is processed based on the assignment information at the transmitting apparatus such that: the first data is modulated by a first modulation section, converted by a conversion section from a time-domain to a frequency-domain and mapped to subcarriers localized in the frequency-domain; the second data is modulated by a second modulation section and mapped to subcarriers in the frequency-domain without passing the conversion section; and the first data and the second data is reverse converted from the frequency-domain to the time-domain.

6. The receiving apparatus according to claim 5, wherein the assignment information indicates that at least one of the first data and the second data is assigned to the transmitting apparatus.

7. The receiving apparatus according to claim 5, wherein the assignment information indicates that at least one of the first data and the second data is assigned to the transmitting apparatus, and the assignment information further indicates a coding rate, modulation scheme, and subcarriers for said at least one of the first data and the second data that is assigned.

8. The receiving apparatus according to claim 5, wherein the first data is a single-carrier signal, and the second data is an orthogonal frequency division multiplexing (OFDM) signal.

9. A transmitting method comprising:
receiving assignment information;
performing data processing for first data and second data based on the assignment information; and
transmitting said first data and second data,
wherein said data processing comprises:
first-modulating the first data;
second-modulating the second data;
converting the modulated first data from a time-domain to a frequency-domain;
mapping, to subcarriers in the frequency domain, the first data that is converted from the time-domain to the frequency-domain and the second data that is second-modulated without being converted from the time-domain to the frequency-domain; and
reverse-converting the mapped first data and the mapped second data from the frequency-domain to the time-domain, wherein:
the first data is mapped to subcarriers localized in the frequency-domain.

10. A receiving method comprising:
assigning at least one of first data and second data to a transmitting apparatus;
transmitting assignment information to the transmitting apparatus; and
receiving said at least one of the first data and the second data transmitted from the transmitting apparatus,
wherein, said at least one of the first data and the second data is processed based on the assignment information at the transmitting apparatus such that: the first data is first-modulated, converted from a time-domain to a frequency-domain and mapped to subcarriers localized in the frequency-domain; the second data is second-modulated and mapped to subcarriers in the frequency-domain without being converted from the time-domain to the frequency-domain; and the first data and the second data is reverse converted from the frequency-domain to the time-domain.

* * * * *